(12) United States Patent
Yan et al.

(10) Patent No.: US 10,827,023 B1
(45) Date of Patent: Nov. 3, 2020

(54) WEB CONTROL WITH REAL-TIME CONTENT ANALYSIS

(71) Applicant: DLD Technologies Corporation, Santa Clara, CA (US)

(72) Inventors: Hong Yan, San Jose, CA (US); Fengqiong Qin, Santa Clara, CA (US)

(73) Assignee: DLD TECHNOLOGIES CORPORATION, Santa Clara, CA (US)

( * ) Notice: Subject to any disclaimer, the term of this patent is extended or adjusted under 35 U.S.C. 154(b) by 0 days.

(21) Appl. No.: 16/444,097

(22) Filed: Jun. 18, 2019

Related U.S. Application Data

(60) Provisional application No. 62/696,602, filed on Jul. 11, 2018.

(51) Int. Cl.
*H04L 29/08* (2006.01)
*H04L 12/58* (2006.01)
*H04R 29/00* (2006.01)

(52) U.S. Cl.
CPC .......... *H04L 67/2823* (2013.01); *H04L 51/12* (2013.01); *H04L 67/10* (2013.01); *H04L 67/22* (2013.01); *H04L 67/02* (2013.01); *H04R 29/008* (2013.01)

(58) Field of Classification Search
CPC .................................................. H04L 67/2823
See application file for complete search history.

(56) References Cited

U.S. PATENT DOCUMENTS

2018/0137197 A1* 5/2018 Kumar ................... H04L 67/02
2018/0314756 A1* 11/2018 Wang ..................... G06Q 50/01

* cited by examiner

*Primary Examiner* — Adnan M Mirza
(74) *Attorney, Agent, or Firm* — Patent Law Works LLP

(57) ABSTRACT

The present disclosure describes a client-based web control system for analyzing and filtering web content received at a user device and presenting the filtered content on the user device in real-time, one or more operations and functions being efficiently achieved via this system comprise: receiving, at a user device, web content; identifying, at the user device, at least one model for classifying the web content; performing, at the user device, real-time analysis on the web content using the at least one model to classify the web content and determine a classification result; and taking an action on the web content at the user device based on the classification result. The present disclosure also describes the web control system including a cloud server, which, in conjunction with the user device, analyzes and classifies the web content.

18 Claims, 20 Drawing Sheets

WEB CONTROL WITH REAL-TIME CONTENT ANALYSIS

CROSS-REFERENCE TO RELATED APPLICATIONS

The present application claims priority, under 35 U.S.C. § 119(e), to U.S. Provisional Patent Application No. 62/696,602, filed Jul. 11, 2018, entitled "Browser Web Control with Real-time Content Analysis," the entireties of which are incorporated herein by reference.

FIELD OF THE INVENTION

The present disclosure relates to web content control. In particular, the present disclosure relates to a client-based web control system for analyzing and filtering web content received at a user device and presenting the filtered content on the user device in real-time.

BACKGROUND

With the growth of internet services, it has become increasingly popular to control internet content to prevent a user from accessing inappropriate or harmful materials. For example, parental control and school web filtering have been more and more important due to the growing issues of cyberbullying, porn, violence, etc. How to protect internet users, particularly children and students, and increase productivity on the internet are the major concerns that need to be addressed when designing a web control tool.

Most of the traditional parental control tools and web filtering software use static blacklist(s), whitelist(s), keyword(s) to control the websites which students may access. These static lists usually classify the web content by domains, which may fail to classify the mixed content of a website and thus affect the control accuracy and efficiency.

In addition, the content on the internet is growing more and more dynamic due to the advent and development of social networks, which also cause the existing parent control tools and web filtering software to be ineffective. Neither the foregoing static lists may be operable over the dynamic content, nor may the web page pre-crawl used in the existing control mechanism handle the dynamic content. For example, the pre-crawl cannot access the pages that require login information, or capture the real-time chatting messages, or process photo sharing and video uploading/downloading, or operate on other information shown in social networks.

Moreover, if a proxy server is configured for web filtering, as currently used in many schools, students may easily bypass the filtering by using other technology such as a virtual private network (VPN).

SUMMARY

The techniques introduced herein overcome the deficiencies and limitations of the prior art at least in part by providing systems and methods for analyzing and filtering web content received at a user device and presenting the filtered content on the user device in real-time.

The techniques introduced herein describe a client-based web control system that performs real-time analysis and classification on the web content after the web content is received at a user device and before any information relevant to the web content is displayed on the user device, thereby minimizing the exposure of the inappropriate content to a user accessing the user device. To restrict and control the content delivered over the internet that a user is authorized to access, instead of using the static whitelist/blacklist, the present disclosure allows the inappropriate content to be captured in real time, and therefore is adapted to accurate classification of the often-changed web content or even instantaneous online messages transmitted between users. In addition, the present disclosure utilizes the user's personal device to perform the content analysis, and therefore achieves scalable content control. It solves the poor performance problem of using a proxy server to perform real-time analysis of the content, which can be easily invalidated and cannot be scaled up as well. Further, more than generating a warning, the present disclosure supports the flexible content presentation, depending on whether the content is appropriate, inappropriate, or appropriate with some inappropriate materials.

According to one innovative aspect of the subject matter in this disclosure, a computer-implemented method comprising: receiving, at a user device, web content; identifying, at the user device, at least one model for classifying the web content; performing, at the user device, real-time analysis on the web content using the at least one model to classify the web content and determine a classification result; and taking an action on the web content at the user device based on the classification result.

According to another innovative aspect of the subject matter in this disclosure, a computer-implemented method comprising: receiving, at a user device, web content; determining whether to classify the web content by the use device; responsive to determining classify the web content by the user device, identifying, by the user device, at least one model for classifying the web content; and performing, by the user device, the real-time analysis on the web content using the at least one model to classify the web content and determine a classification result; responsive to determining not to classify the web content by the user device, notifying, by the user device, a cloud server for classifying the web content and determining the classification result; and receiving, by the user device, the classification result from the cloud server; and taking an action on the web content at the user device based on the classification result.

Other implementations of one or more of these aspects include corresponding systems, apparatus, and computer programs, configured to perform the actions of the methods, encoded on computer storage devices.

These and other implementations may each optionally include one or more of the following features. For instance, extracting, at the user device, a type of media data extracted from the web content; wherein the type of media data includes at least one of a video, audio, image, and text; and wherein the real-time analysis is performed on the type of media data. The other features include: identifying a key passage from the text based on the at least one model; determining and analyzing context of the key passage using the at least one model; and wherein performing, at the user device, the real-time analysis on the web content includes classifying the key passage based on the text and the at least one model. The other features include: sampling the video at a rate to determine a set of sample images; and wherein performing, at the user device, the real-time analysis on the web content includes classifying the sample images in the set. The other features include computing a controlled image ratio based on classifying the sample images; determining whether the controlled image ratio exceeds a threshold ratio, the threshold ratio including at least a minimum ratio and a maximum ratio; and wherein taking the action on the web content at the user device is based on the determination. The other features include transforming the audio to spectrograms, a spectrogram being a two-dimensional image; and wherein performing, at the user device, the real-time analysis on the web content includes classifying the spectrograms using the at least one model. The other features include, responsive to performing, at the user device, the real-time analysis on the web content using the at least one model to classify the web content and determine the classification result, determining whether verification of a classification included in the classification result is needed; responsive to determining the verification is needed, sending a verification request to a cloud server for verifying the classification; and wherein taking the action on the web content at the user device is based on the verification of the classification. In addition, the real-time analysis is performed after the web content is received at the user device and before information relevant to the web content is displayed on the user device; the action includes at least one of notifying the user device of a block of the web content, presenting the web content on the user device, and presenting a portion of the web content with a specific effect on the user device; and the specific effect includes at least one of blurring an image, redacting a word, muting an audio portion.

It should be understood that language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings, in which like reference numerals are used to refer to like or similar elements.

DETAILED DESCRIPTION

The present disclosure describes systems and methods for analyzing and filtering web content received at a user device and presenting the filtered content on the user device in real-time. In the following descriptions, for purpose of explanation, numerous specific details are set forth in order to provide a thorough understanding of the present disclosure. However, it should be noted that the present disclosure might be practiced without these specific details.

Figure 1A:
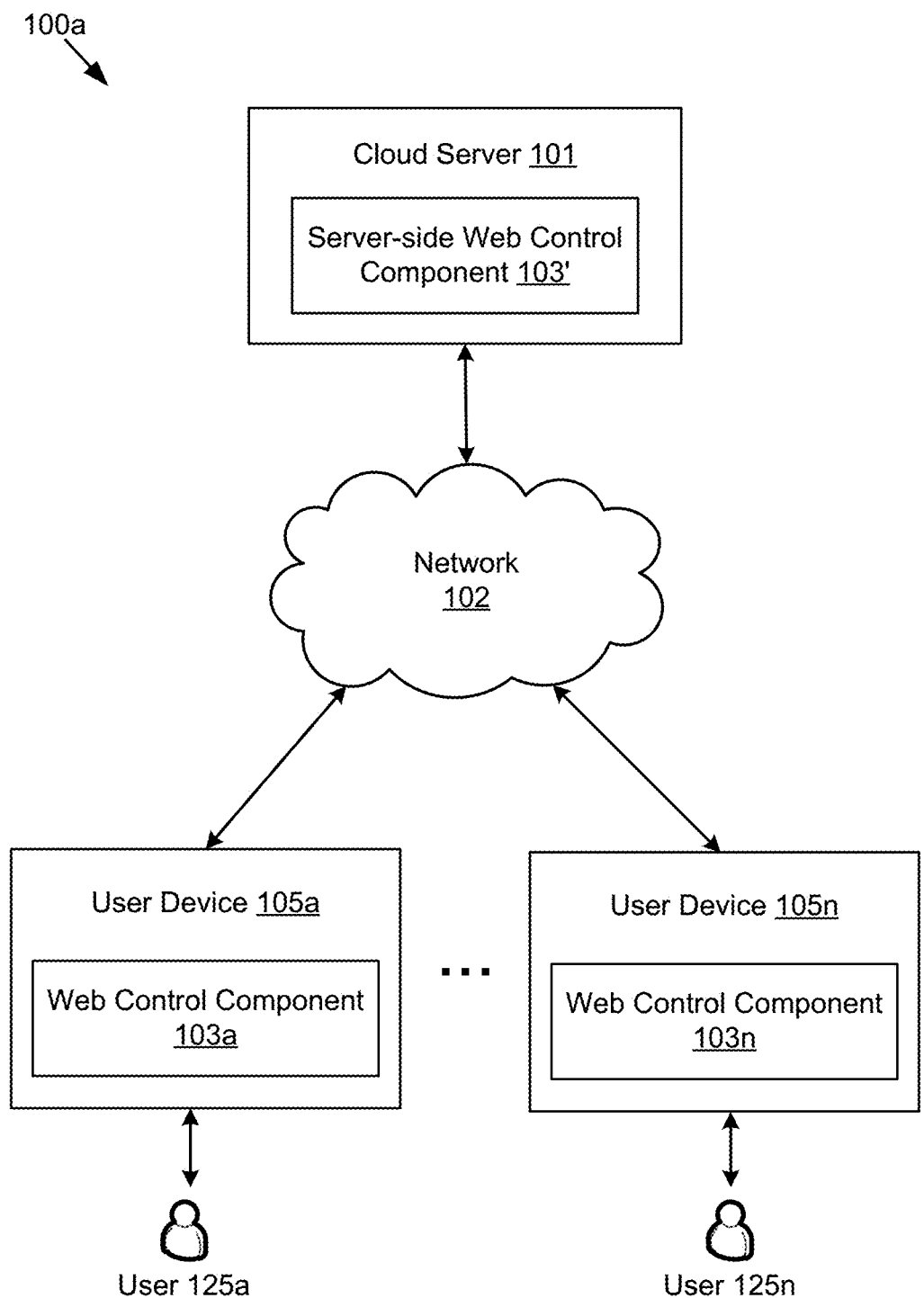
FIGS. 1A and 1B are block diagrams illustrating example web control systems for analyzing and filtering web content received on a user device.

FIG. 1A is a block diagram illustrating an example web control system 100a for analyzing and filtering web content received at a user device. As illustrated, the web control system 100a may include a cloud server 101 and one or more user devices 105a . . . 105n, which connect with each other via a network 102.

The network 102 includes hardware, software, and/or firmware that provide communications between the cloud server 101 and the user devices 105a . . . 105n. In some embodiments, the network 102 may be a conventional type, wired and/or wireless, and may have numerous different configurations including a star configuration, token ring configuration, or other configurations. For instance, the network 102 may include one or more local area networks (LAN), wide area networks (WAN) (e.g., the Internet), satellite networks, telephone or cable networks, cellular networks, public networks, private networks, virtual networks, peer-to-peer networks, wireless networks implemented using a wireless protocol such as WiFi® or WiMax®, and/or any other interconnected data paths across which multiple devices may communicate. Although FIG. 1A illustrates a single block for the network 102, it should be understood that the network 102 may in practice comprise any number of combinations of networks, as noted above.

The user devices 105a . . . 105n respectively accessed by users 125a . . . 125n, or collectively referred hereafter as user device 105 accessed by user 125, is a computing device including a processor, a memory, applications, a database, and network communication capabilities. For example, the user device 105 may be a laptop computer, a desktop computer, a tablet computer, a mobile telephone, a personal digital assistant (PDA), a mobile email device, a television with one or more processors embedded therein or coupled thereto or any other electronic device capable of accessing the network 102 and communicating with other entities of the web control system 100a.

The user device 105 receives and sends data to and from the user 125 accessing the user device 105. For example, the user device 105 may receive a web content request from the user 125 via a browser resided on the user device 105, and communicate with a source server (not shown) to process the web content request and send the web content for display on the user device 105. The user device 105 may also allow a user to exchange and share content such as posts, photos, comments, etc., with other users through one or more web media applications (e.g., a social media application) installed on the user device 105.

As illustrated in FIG. 1A, each of the user devices 105a and 105n includes an instance of a web control component 103, i.e., a web control component 103a and a web control component 103n. The web control component 103 allows the content received at the user device 105 to be identified, classified, and filtered prior to being displayed on the user device 105.

The web control component 103 may perform real-time content analysis and classification on web content received at the user device 105 to detect inappropriate or controlled content. In some embodiments, the web control component 103 may classify and filter one or more of texts, images, videos, and audios using a machine learning algorithm to determine which content should be controlled. Responsive to detecting the inappropriate or controlled content, the web control component 103 may take an action based on one or more configured policies, for example, blocking the inappropriate content or generating an alert. It should be noted that the web control component 103 performs content analysis and takes action(s) after the content is received at the user device 105 (e.g., after a browser loads a webpage on the user device) and before any information relevant to the web content is presented on the user device 105 to a user. The web control component 103 efficiently and accurately performs the content analysis so as to achieve the goal of filtering and displaying the content within a short time period between receiving the content and displaying the content. The web control component 103 further performs the content analysis dynamically based on analyzing the received dynamic content itself rather than relying on a static blacklist or a whitelist to filter the content. The operations of an embodiment of the web control component 103 are described further in detail with reference to at least FIG. 3.

The cloud server 101 includes hardware, software, and/or firmware that assist and facilitate the web content control initiated on the user device 105. The cloud server 101 may be one of a variety of types of computing devices, for example, a physical server, a virtual server, a desktop computer, and the like.

In some embodiments, the cloud server 101 may include a server-side web control component 103', which performs server-assisted analysis to help the web control component 103 on the user device 105 to classify certain web content into a category. For example, the server-side web control component 103' may verify the classification of certain web content responsive to a verification request sent from the web control component 103 of the user device 105. In some embodiments, the web control component 103 on the user device 105 may determine that a confidence level or an accuracy rate of classification for certain content is lower than a predefined threshold, and then send a request to the cloud server 101 to verify the classification of the certain content. In other embodiments, the web control component 103 may not intercept the web content received at the user device 105, for example, due to cross-origin resource sharing restriction (CORS), and thus directly send a request to the cloud server 101 to classify the web content without initiating the local classification on the user device 105. In this case, no model needs to be run on the user device, thereby reducing the computing burden on the client side. The verification process will be described further in detail with reference to at least FIG. 3.

In some embodiments, the cloud server 101 may run a full model instead of a lightweight model as used in the client or user device 105 for performing complicated content analysis responsive to receiving a verification request from the client or user device 105. In other embodiments, responsive to a request being sent by the user device 105 to the cloud server 101 to assist the analysis, for example, when the client or the user device 105 cannot get the images/video frames for analysis purpose, the cloud server 101 runs the client lightweight model in addition to the cloud full model. The cloud server 101 may fetch the images in batch and analyze the images with the lightweight model first. If there is any problem or doubt from the analysis using the lightweight model, the cloud server 101 runs the full model to determine an analysis result and feedback the analysis result to the user device 105. By doing so, the client may get an analysis result in advance, even before those images or portion of the video is displayed to the user.

To reduce the latency of displaying the content on the user device 105, in some embodiments, the web control component 103 on the user device 105 may focus on accurate content classification on some categories, while sending a verification request to the web control component 103' on the cloud server 101 to accurately classify content on other categories. Due to the limited computing resources of the user device 105 (e.g., a mobile phone), in some embodiments, the web control component 103 on the user device 105 may leave the complicated and resource-costly content classification to the server-side web control component 103' for processing. The web control component 103 and the server-side web control component 103' may build and train different models to analyze different content and classify the different content to different categories.

The cloud server 101 may balance the workload with the user device 105. For example, the text analysis may be handled by one of the cloud server 101 and the user device 105, or by a combination of the cloud server 101 and the user device 105. Because a model for processing text is usually not as heavy as a model for processing an image, the text analysis may be entirely implemented by the web control component 103' of the cloud server 101 because it is more secure and easier to protect models on the cloud server 101 as compared to the user device 105. When the text analysis becomes more complex, a lightweight model (e.g., running on the client side) may be used.

Figure 1B:
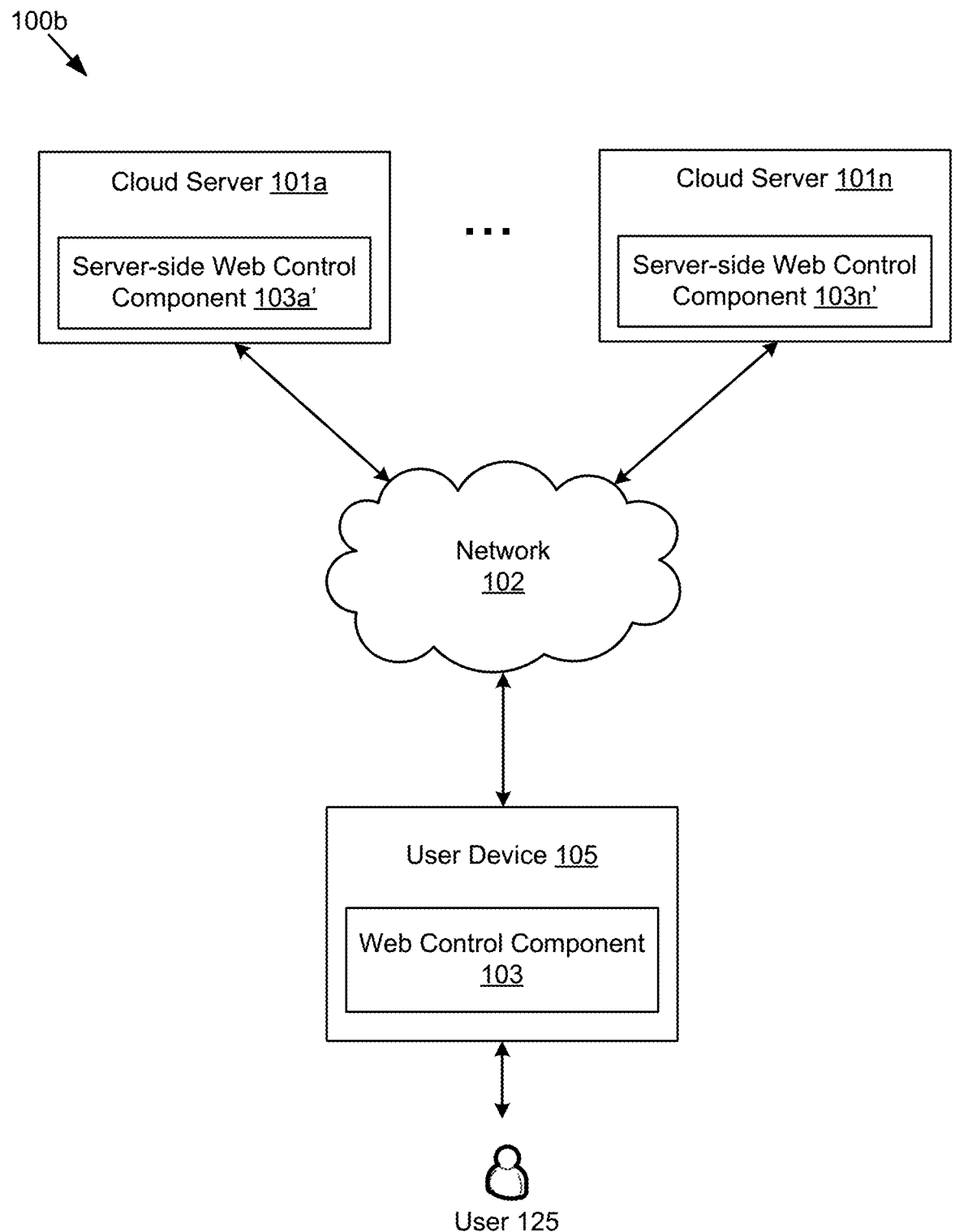

Although FIG. 1A includes only one single cloud server 101 for assisting the content analysis on the one or more user devices 105, multiple cloud servers 101 may be used in a web control system. Referring to FIG. 1B, a block diagram illustrating another example web control system 100b includes multiple cloud servers 101a . . . 101n. The multiple cloud servers 101a . . . 101n may be deployed according to locations, provided functionalities, or other criteria. For example, the cloud server 101a at location A may be configured to receive and respond to verification requests from region B, or may be configured to handle only verification requests for images. Accordingly, the user device 105 may be configured to send a verification request to a specific cloud server, depending on a location of the user device 105, a type of the verification request, etc.

Figure 2B:
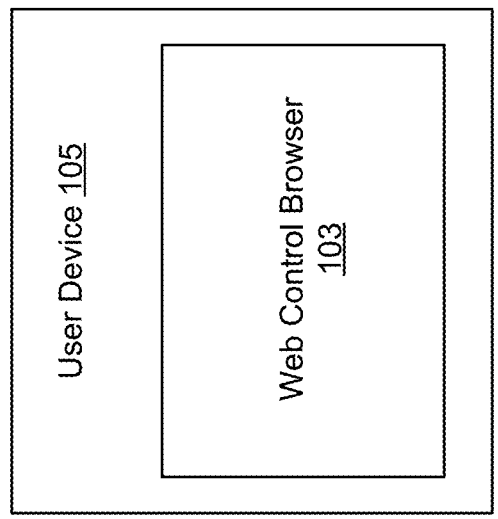
FIGS. 2A-2D are block diagrams illustrating example types of a web control component.
Figure 2A:
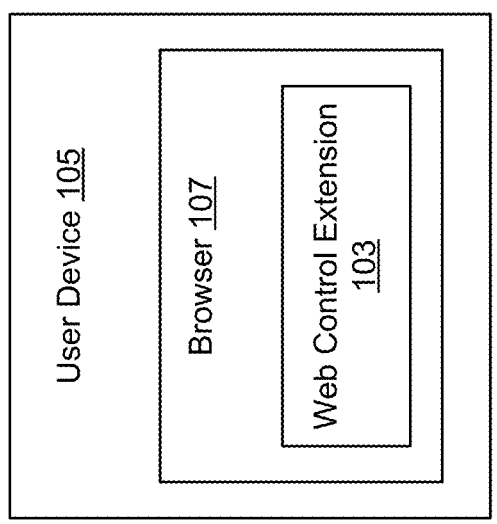

FIGS. 2A-2D are block diagrams illustrating example types of a web control component 103 included in the user device 105. As shown in FIG. 2A, the web control component is a web control extension 103 of a browser 107 installed on the user device 105. Typically, without the web control extension 103, when a user accessing the user device 105 requests a web page via the browser 107, the browser 107 loads the web page from a source server, creates a document object model (DOM) tree of the page, and renders the page for display on the user device 105. Once the web control extension 103 is embedded in the browser 107, it intercepts the web page data loaded by the browser 107 on the user device 105, analyzes and classifies the intercepted data, and determines what content to be displayed on the user device 105 via the browser 107.

The web control extension 103 may be a small software module for customizing a web browser, e.g., a Google Chrome, to perform a web control function. In other embodiments, the web control extension 103 may include certain scripts injected into a webpage through a mechanism that perform the web control function, for example, in Safari of Apple product.

FIG. 2B also shows a user device 105 with a browser, where this browser itself is the web control component, i.e., the web control browser 103. The web control browser 103 classifies the content loaded on the user device 105 before actually displaying any information relevant to the content on the user device 105.

Figure 2D:
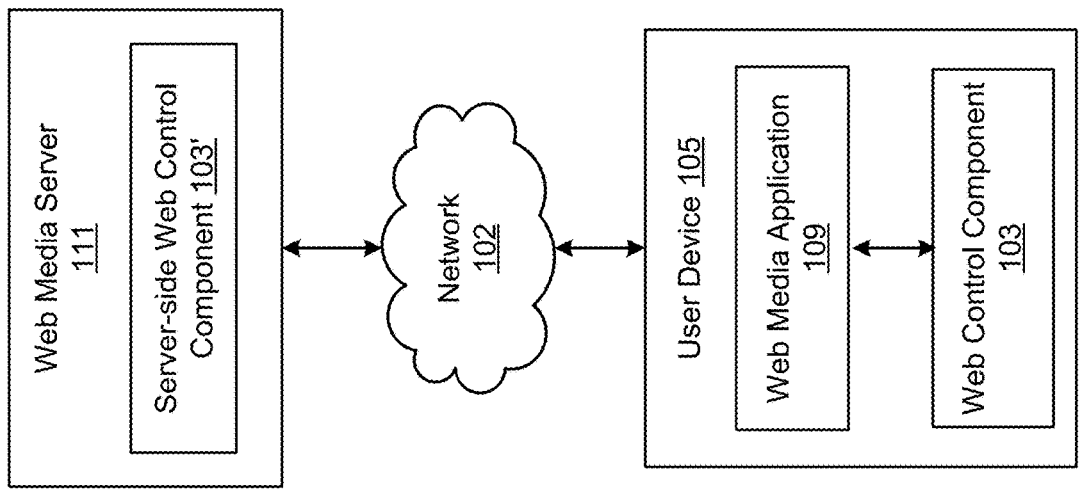
Figure 2C:
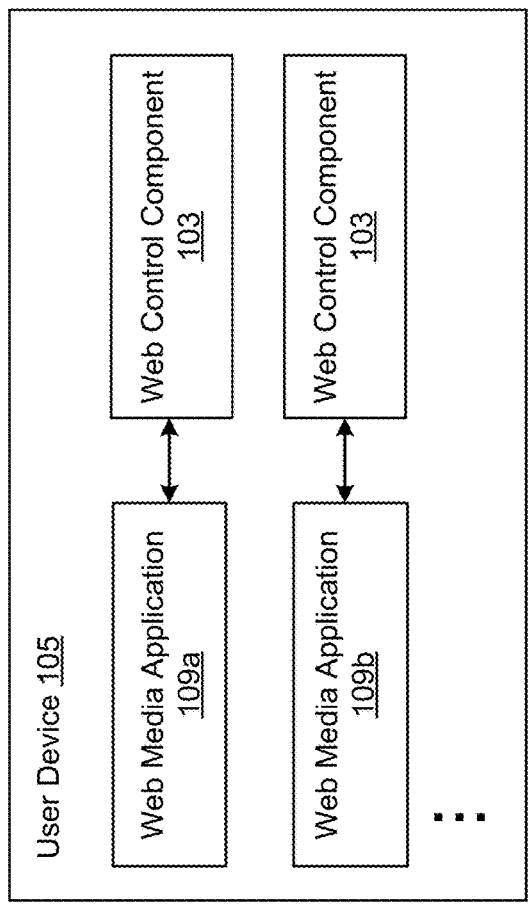

The user device 105 shown in FIG. 2C includes one or more web media applications 109a, 109b . . . , and one or more web control components 103 interacting with these web media applications. A web media application 109a, 109b (collectively web media application 109) may be a computer program designed to allow users to exchange electronic communications, such as an email application. The web media application 109 may also be an interactive computer application that facilitates the creation and sharing of information, e.g., a social networking application such as Facebook™, Youtube™, Instagram™, etc. It will be obvious to one skilled in the art that other types of web media applications are possible, for example, the web media application may be a telecommunication application that specializes in providing video chats, such as Skype™.

As depicted in FIG. 2C, in some embodiments, the web control component 103 is separate from the web media application 109, and interacts with the web media application 109 through an interface. In other embodiments, the web control component 103 may be integrated into the web media application 109 to be part of the web media application 109. In either case, the web media application 103 performs the content analysis before the content received at a web media application is presented to a user via the web media application 109.

Compared to FIG. 2C, in FIG. 2D, not only a web control component 103 communicates with the web media application 109 to perform content analysis on the user device or client side, the server-side web control component 103' is also included in the web media server side to assist the content analysis performed on the user device 105. The server-side web control component 103' on the web media server 111 may target and perform content analysis on the information transmitted over the specific channel between the web media server and the web media application, which relieves the computing burden on the client side as well as increasing the processing speed and efficiency.

It is to be understood that, although the operations of the web control component 103 may mainly be described hereafter in the context of analyzing web content loaded by a browser on a user device as shown in FIG. 2A or 2B, the web control component 103 may be of different types and be applied and operated in different scenarios or context as shown in FIGS. 2C and 2D.

Figure 3:
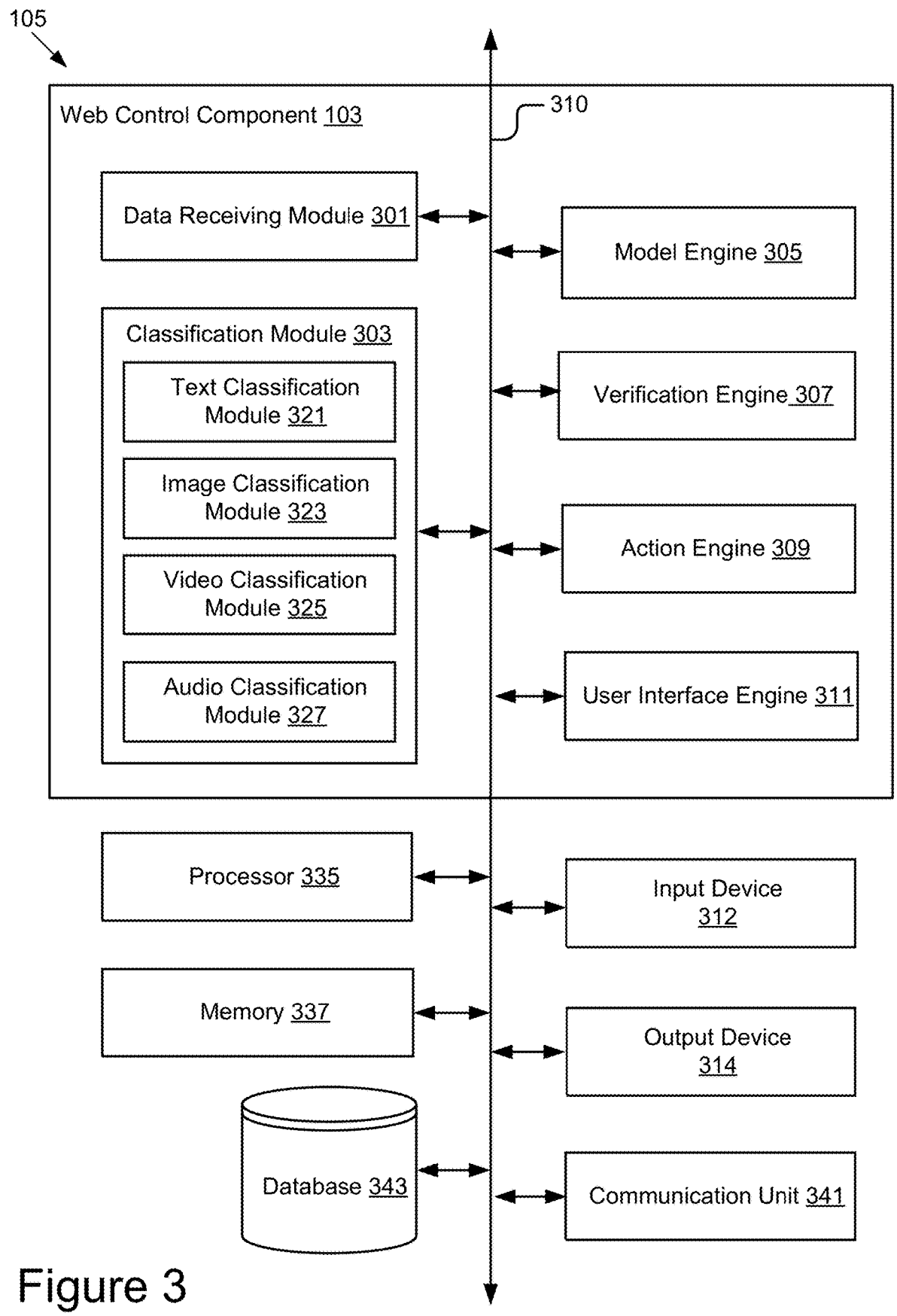
FIG. 3 is a block diagram of an example user device including a web control component.

FIG. 3 is a block diagram that illustrates an example user device 105. As illustrated, the user device 105 may include a web control component 103, a processor 335, a memory 337, an input device 312, an output device 314, a communication unit 341, a database 343, which may be communicatively coupled by a communication bus 310. The components in the figure are provided merely for illustrative purpose, but not as a limitation. More, fewer or other components may be applicable and contemplated.

As used in this present disclosure, the terms "system" and "component" are intended to refer to a computer-related entity, either hardware, a combination of hardware and software, software, or software in execution. For example, a component can be, but is not limited to, a process running on a processor, a hard disk drive, multiple storage drives (of optical and/or magnetic storage medium), an object, an executable, a thread of execution, a program, and/or a computer. By way of illustration, both an application running on a server and the server itself can be a component. One or more components may reside within a process and/or thread of execution, and a component may be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information may be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

The processor 335 comprises an arithmetic logic unit, a microprocessor, a general purpose controller or some other processor array to perform computations and provide electronic display signals to a display device. The processor 335 may be coupled to the bus 310 for communication with the other components. The processor 335 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. The processing capability might be enough to perform complex tasks, including various types of feature extraction and matching. It will be obvious to one skilled in the art that other processors, operating systems, sensors, displays and physical configurations are possible.

The memory 337 stores instructions and/or data that may be executed by processor 335. The memory 337 is coupled to the bus 310 for communication with the other components. The instructions and/or data may comprise code for performing any and/or all of the techniques described herein. The memory 337 may be a dynamic random access memory (DRAM) device, a static random access memory (SRAM) device, flash memory or some other memory device known in the art. In some embodiments, the memory 337 also includes a non-volatile memory or similar permanent storage device and media such as a hard disk drive, a floppy disk drive, a CD ROM device, a DVD ROM device, a DVD RAM device, a DVD RW device, a flash memory device, or some other mass storage device known in the art for storing information on a more permanent basis.

The communication unit 341 may include one or more interface devices (I/F) for wired and wireless connectivity among the components of the web control system 100. For instance, the communication unit 341 may include, but is not limited to, various types of known connectivity and interface options. The communication unit 341 may be coupled to the other components of the user device 105 via the bus 310. The communication unit 341 can provide other connections to the network 102 and to other entities of the web control system 100a/100b using various standard communication protocols.

In some embodiments, the communication unit 341 includes a wireless transceiver for exchanging data with the cloud server 101, the web media server 111, or any other communication channel using one or more wireless communication methods, such as IEEE 802.11, IEEE 802.16, BLUETOOTH® or another suitable wireless communication method.

In some embodiments, the communication unit 341 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In some embodiments, the communication unit 341 includes a wired port and a wireless transceiver. The communication unit 341 also provides other conventional connections to the network for distribution of files and/or media objects using standard network protocols such as TCP/IP, HTTP, HTTPS and SMTP as will be understood to those skilled in the art.

The database 343 may include information sources for storing and providing access to data. In some implementations, the database 343 may store data associated with a database management system (DBMS) operable on the web control system 100a/100b. For example, the DBMS could include a structured query language (SQL) DBMS, a NoSQL DBMS, various combinations thereof, etc. In some instances, the DBMS may store data in multi-dimensional tables comprised of rows and columns, and manipulate, (e.g., insert, query, update and/or delete), rows of data using programmatic operations.

The database 343 may be included in the user device 105 or in another computing system and/or storage system distinct from but coupled to or accessible by the user device 105. The database 343 can include one or more non-transitory computer-readable mediums for storing the data. In some implementations, the database 343 may be incorporated with the memory 337 or may be distinct therefrom.

The input device 312 may include any device for inputting information into the user device 105. In some embodiments, the input device 312 may include one or more peripheral devices. For example, the input device 312 may include a keyboard, a pointing device, microphone, an image/video capture device (e.g., camera), a touch-screen display integrated with the output device 314, etc. The output device 314 may be any device capable of outputting information from the user device 105. The output device 314 may include one or more of a display (LCD, OLED, etc.), a printer, a haptic device, an audio reproduction device, a touch-screen display, a remote computing device, etc. In some implementations, the output device is a display which may display electronic images and data output by a processor of the user device 105 for presentation to a user, such as the processor 335 or another dedicated processor.

The bus 310 may include a communication bus for transferring data between components of a computing device or between computing devices, a network bus system including the network 102 or portions thereof, a processor mesh, a combination thereof, etc. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The components 103, 335, 337, 341, 343, 312, and/or 314 may be communicatively coupled by bus 310 and/or processor 335 to one another and/or the other components of the user device 105. In some implementations, the components 103, 335, 337, 341, 343, 312, and/or 314 may include computer logic (e.g., software logic, hardware logic, etc.) executable by the processor 335 to provide their acts and/or functionality. In any of the foregoing implementations, these components 103, 335, 337, 341, 343, 312, and/or 314 may be adapted for cooperation and communication with processor 335 and the other components of the user device 105.

In some embodiments, the web control component 103 includes a data receiving module 301, a classification module 303, a model engine 305, a verification engine 307, an action engine 309, and a user interface engine 311.

Figure 4:
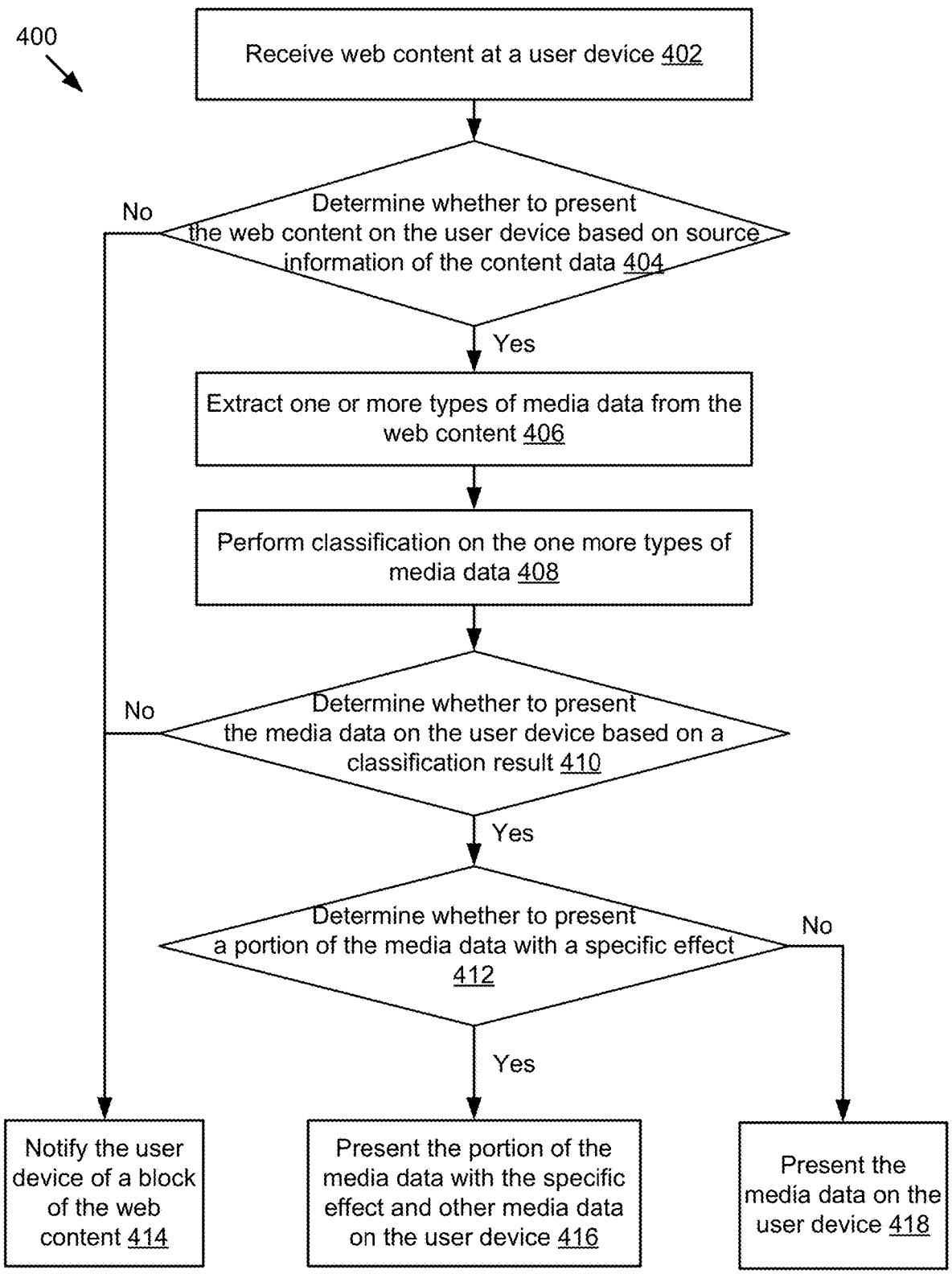
FIG. 4 is a flowchart of an example method for processing web content for display on a user device.

The modules/engines 301, 303, 305, 307, 309, and 311 in conjunction with other entities in the web control system 101a/101b implement the functionality of filtering web content and displaying the filtered content on a user device, which is outlined in FIG. 4. Referring to FIG. 4, at step 402, the data receiving module 301 receives web content at a user device. At step 404, the data receiving module 301 determines whether to present the web content on the user device based on source information of the content data. If it is determined that the web content cannot be displayed to a user, the method 400 proceeds to step 414, where the data receiving module 301 communicates with the action engine 309 and the user interface engine 311 to notify the user device of a block of the web content. If it is determined that the web content can be displayed to a user, at step 406, the data receiving module 301 extracts one or more types of media data, e.g., video, audio, image, or text, from the web content, and forwards the media data to the classification module 303.

At step 408, the classification module 303 communicates with the model engine 305 and the verification engine 307 to perform classification on the one or more types of media data, and sends a classification result to the action engine 309.

At step 410, the action engine 309 determines whether to present the media data on the user device based on the classification result. If it is determined not to display the media data, the action engine 309 instructs the user interface engine 311 to notify the user device of a block of the web content at step 414. Otherwise, at step 412, the action engine 309 determines whether to present a portion of the media data with a specific effect, for example, blurring an image, mute an audio portion, etc. If it is determined that a portion of the media data needs to be presented with the specific effect, at step 416, the action engine 309 communicates with the user interface engine 311 to present the portion of the media data with the specific effect and other media data on the user device. If the action engine 309 determines that no portion needs to be presented with the specific effect, at step 418, the action engine 309 and the user interface engine 311 together present the media data on the user device.

Referring back to FIG. 3, each module/engine of the web control component 103 is described in detail. The data receiving module 301 includes hardware, software, and/or firmware for receiving and pre-processing web content data at the user device 105. In some embodiments, the user 125 accessing the user device 105 sends a request for web content to a source server (not shown) via a browser. The source server processes the request and sends out the requested web content for the browser to load on the user device 105. The data receiving module 301 receives or intercepts the web content data loaded by the browser on the user device 105 before the content is displayed on the user device 105 via the browser. In other embodiments, the data receiving module 301 communicates with a web media application 109 to intercept the web content data transmitted to a user of the web media application 109 for analyzing and filtering. Only the filtered content may be displayed to the user.

However, it is possible that the data receiving module 301 may not intercept the web content received at the user device 105, e.g., due to cross-origin resource sharing restriction. In this case, the data receiving module 301 determines that no classification needs to be implemented on the user device 105, and sends a request to the cloud server 101 via the verification engine 307 to notify the cloud server 101 to take over the content classification and return the classification result back to the user device 105. Since no classification can be implemented on the user device 105, the classification module 303 and the model engine 305 will not be triggered. For example, no AI model will be running on the user device 105. Therefore the computing resource consumption on the user device 105 will be significantly reduced.

Responsive to receiving the web content, the data receiving module 301 may identify source information of the web content, e.g., a source address or a domain from which the web content was originated, and examine the source information in a blacklist and/or a whitelist to determine an action to be taken on the content. If the source information is found in the blacklist, the data receiving module 301 may instruct the action engine 309 to block the content and notify the user of the content block. If the source information is found in the whitelist, the data receiving module 301 may determine that further analysis of the content can be skipped, and instruct the action engine 309 to directly allow the access of content to the user 125 of the user device 105. If neither the blacklist nor the whitelist includes the source information, the data receiving module 301 may extract different types of media data, i.e., video, image, text, audio, from the received content data, and transmit the extracted media data to the classification module 303 for analysis and classification.

The whitelist/blacklist is relatively static as compared to the dynamic web content because the whitelist/blacklist may not be updated timely to track all the dynamic changes of the web content. For example, specific web content may currently include harmful materials that make the content no longer appropriate for a whitelist but fail to be identified by the outdated whitelist. To avoid such specific web content to be presented to a user on the user device, in some embodiments, when the source information of the web content is found in the whitelist and when the source information of the web content is not included in both the whitelist and the blacklist, the data receiving module 301 extracts the media data and sends the extracted data to the classification module 303 for further processing. In other words, as long as the source information is not found in the blacklist, i.e., the web content is not blocked, the real-time analysis is performed on the web content to determine an action to be taken on the web content.

The data receiving module 301 may receive the blacklist/whitelist from the cloud server 101, the web media server 111, or other applications/servers. The receiving of the blacklist/whitelist may occur once, e.g., when the web control system is initially configured. Or the data receiving module 301 may send a request for the blacklist/whitelist periodically (e.g., every week), for example, to the cloud server 101 that maintains and updates the static list. The data receiving module 301 stores a local copy of the blacklist/whitelist on the database 343 for fast access.

In some embodiments, the data receiving module 301 may also update the blacklist/whitelist based on the real-time content analysis performed on the user device 105. For example, the data receiving module 301 may communicate with the classification module 303 to receive a classification result of a specific webpage, and add, delete, or modify an entry of the specific webpage in the blacklist/whitelist based on the classification result. If there is a conflict, the updated blacklist/whitelist overrides the received blacklist/whitelist.

Although the blacklist/whitelist is static (with dynamic updates), using the blacklist/whitelist to pre-filter the content generally expedites the classification process of the web content and reduces the computing burden of the user device 105 as the content from a "well-known" source that can be recognized by the blacklist/whitelist is classified without going to a next stage of real-time content analysis. However, using a blacklist/whitelist for pre-filtering the received web content is not required for the subsequent dynamic analysis of the content. The data receiving module 301, in other embodiments, may still be configured to, responsive to receiving/intercepting the web content, extract one or more of the video, audio, image, and text from the web content data, and send the extracted data to the classification module 303 for dynamic analyzing.

The classification module 303 includes hardware, software, and/or firmware for performing real-time analysis on at least one type of media data for classification into at least one category. The different types of media data include the video, audio, image, and text data extracted by the data receiving module 301 from the web content data received at the user device 105. The analysis is real-time because it is completed within a short time period between the time when the content data is received at the user device 105 (e.g., when the browser loads the requested web content data) and the time when the content is displayed on the user device 105. The challenge addressed by the classification module 303 as well as other modules/engines of the web control component 103 is to guarantee accurate content classification while keeping low latency. In other words, the classification module 303 classifies the web content reliably within a time interval that does not influence a user's experience.

In some embodiments, the classification module 303 uses hierarchal categories to classify the web content. For example, the classification module 303 may classify the web content into a category such as an "appropriate" or "inappropriate" category, or a "good" or "bad" category, etc. The classification module 303 may further classify the content falling into the "appropriate" or "good" category into subcategories such as shopping, education, news, art, etc. Similarly, the classification module 303 may also classify the content falling into the "inappropriate" or "bad" category into subcategories such as porn, gambling, isolation, bully, etc. It will be obvious to one skilled in the art that any number of category hierarchy and any number of categories and subcategories are possible. It is also to be noted that, in the description of the present disclosure, the terms "appropriate," "good," and "uncontrolled" may be interchangeably used, and the terms "inappropriate," "bad," and "controlled" may be interchangeably used.

In some embodiments, the classification module 303 includes a text classification module 321, an image classification module 323, a video classification module 325, and an audio classification module 327.

The text classification module 321 is responsible for dynamic text classification. The text classification module 321 analyzes the text extracted from the web content received at the user device 105 and classifies the text into a category using at least one artificial intelligence (AI) model. In some embodiments, the text classification module 321 may communicate with the model engine 305 to build and train the at least one AI model to perform real-time classification using a machine learning algorithm.

In some embodiments, the text classification module 321 may identify a key passage from the text based on the at least one AI model, determine and analyze context of the key passage using the at least one AI model, and classify the key passage based on the context and the at least one AI model. For example, the text classification module 321 may identify a keyword "weed," and classify a first passage about "weed" into a "gardening" category but classify a second passage including both "weed" and "smoke" into an "illegal drug" category.

A key passage may be a word, a phrase, a sentence or a paragraph that is of great significance. The text classification module 321 identifies one or more features from the text, such as how relevant the passage is to the topic of the text, how often the passage appears in the text, how many times the passage appears in other content with similar topics, and determines the key passage based on the one or more features.

The text classification module 321 also identifies the context of the key passage. The context may be determined based on the current text. For example, the context includes a number of times the key passage appears in the text, position(s) the key passage appears in the text, the tone of the text and/or the key passage, the subject matter of the text, a creator of the text, a recipient of the text, a time when the text was created. The context may also be determined based on the previous text of the creator. For example, the context includes a number of times the key passage appeared in the previous text of the creator, time(s) when the previous text was created, interval(s) between the creation of each text including the key passage, etc.

In some embodiments, the text classification module 321 may further communicate with the model engine 305 to identify a group of users that share some commonality with the creator, e.g., students in the same classroom or in the same school, and determine the context around the key passage based on the usage of the key passage in the text of the group of users. For example, the context includes a number of times the key passage appeared in the text of the group of users, a number of users in the group that have used the key passage, time(s) when the group of users used the key passage, etc.

The text classification module 321 reads the key passage in the context based on the at least one AI model, and classifies the text accordingly. For example, the text classification module 321 may initially consider a message as appropriate but modify the category of this message to be inappropriate after it was sent by a first user to a second user five times a day for a week in a row. Or the text classification module 321 may read the passage "jump off a cliff" as an extreme sports activity or as misleading information that would cause a serious consequence, and thus correspond this passage to two different categories.

When reading the key passage in the context, the text classification module 321 may use the at least one AI model to identify a speech pattern, translate a literal meaning of a phrase in the context, expand an acronym, or do other semantic analysis to correctly categorize the key passage. For example, the text classification module 321 may categorize a chatting message as a bully message even if every single word of the message does not belong to an inappropriate or controlled category based on their individual literal meaning.

In some embodiments, the text classification module 321 may compute an accuracy rate or a confidence score for the text classification and determine whether verification for the classification is needed. When the accuracy rate or the confidence score is below a predefined threshold, the text classification module 321 sends a verification request to the cloud server 101, and forwards the text and associated classification or category to the cloud server 101 or the web media server 111 for verification, which will be described in detail with reference to the verification engine 307.

Figure 5:
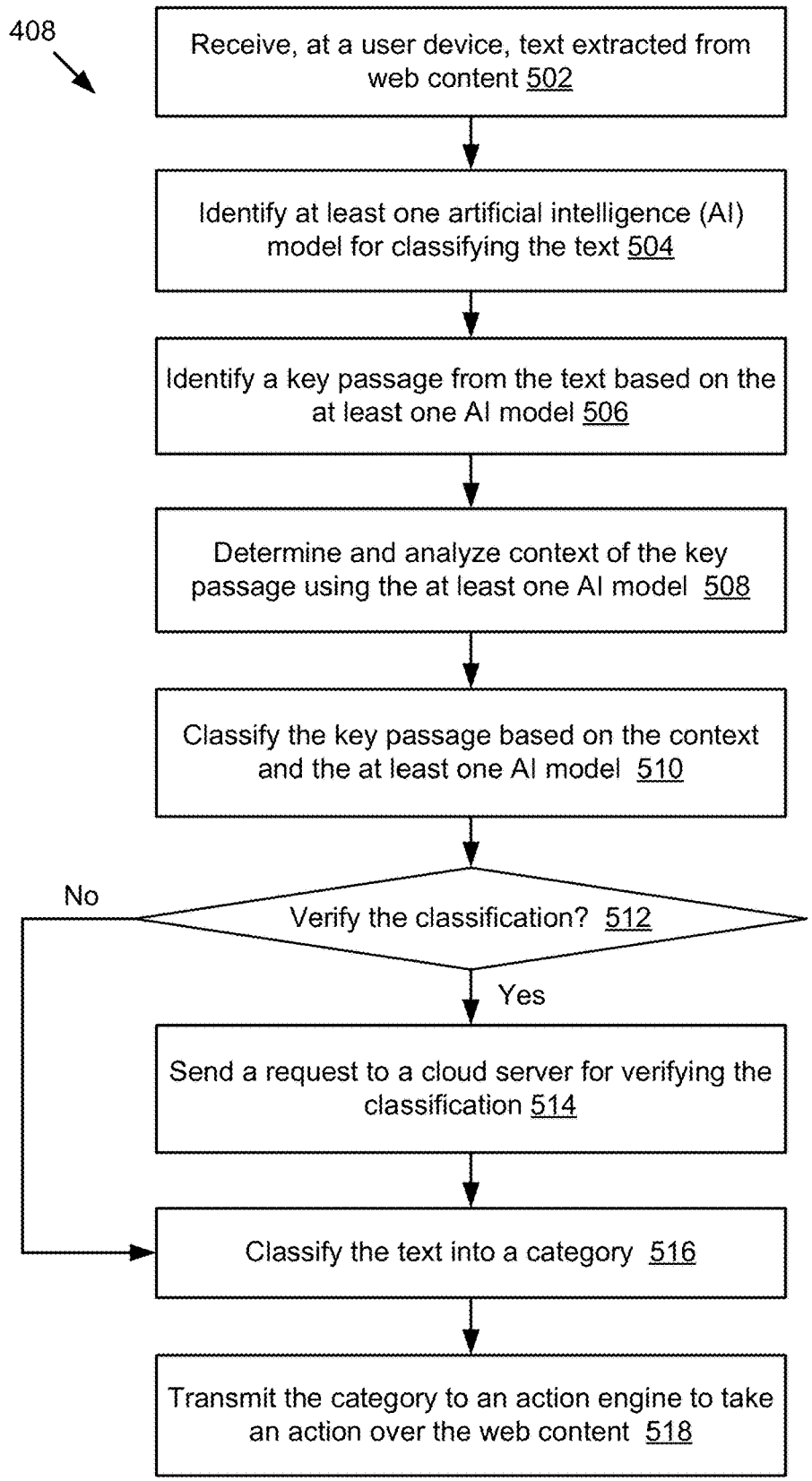
FIG. 5 is a flowchart of an example method for performing dynamic text classification.

FIG. 5 is a flowchart of an example method for performing dynamic text classification by the text classification module 321 in conjunction with the model engine 305, the verification engine 307, and the action engine 309 described below. The method shown in FIG. 5 corresponds to step 408 in FIG. 4.

At step 502, the text classification module 321 receives, at a user device, text extracted from web content. For example, the data receiving module 301 intercepts the web data loaded by a browser at the user device 105, and extracts the text from the web data for transmitting to the text classification module 321. At step 504, the text classification module 321 works with the model engine 305 to identify at least one AI model for classifying the text.

At step 506, the text classification module 321 identifies a key passage from the text based on the at least one AI model. For example, the text classification module 321 determines the title "coffee at location A" of an online conversation in a group B as a key passage. At step 508, the text classification module 321 determines and analyzes context of the key passage using the at least one AI model. At step 510, the text classification module 321 classifies the key passage based on the context and the at least one AI model. For example, the text classification module 321 may classify the key passage "coffee at location A" into a shopping category (if the context shows the price comparison for coffee sold at location A) or an education category (if the context shows advantages of coffee originated from location A).

At step 512, the text classification module 321 determines whether to verify the classification, for example, based on an accuracy rate or a confidence score computed for the classification of the text. If it is determined that no verification is needed, at step 516, the text classification module 321 classifies the text into a category, e.g., a shopping category or an education category. However, if it is determined that the verification is needed, the text classification module 321 communicates with the verification engine 307 to send a request to a cloud server or a web media server for verifying the classification at step 514, and to classify the text into a category at step 516 based on a verification result. At step 518, the text classification module 321 transmits the category to the action engine 309 to take an action over the web content.

Referring back to FIG. 3, which illustrates the image classification module 323 that performs dynamic image classification as needed. In some embodiments, the image classification module 323 communicates with the model engine 305 to identify at least one AI model for classifying image(s) extracted from the web content received at the user device 105 into a category. The image classification module 323 determines whether an image is a controlled image based on the category and a user-configured policy. The controlled image is an image that needs to be blocked or be displayed with a specific effect (e.g., blurring, shadowing). The user-configured policy indicates a user's preference for allowing/blocking information belonging to a category, which may be inputted by the user via a user interface.

The image classification module 323 determines a number of the controlled images before proceeding to a next image, and stops the classification of any remaining images when the determined number exceeds a threshold number. The threshold number indicates a maximum number of controlled images that can be tolerated. The image classification module 323 may specify the threshold number to be smaller than a total number of the images extracted from the web content, so that the image classification may be interrupted before all the images have to be processed, thereby reducing the processing time and increasing the classification efficiency.

In some embodiments, in addition to determining the number of the controlled images, the image classification module 323 may also compute a total area of the controlled images and determine whether to block the entire web content based on the computed area.

In some embodiments, the image classification module 323 also determines an accuracy rate or a confidence score for the classification of an image. For example, if there is a false positive issue in the classification, that is, the classification result shows a positive result of a controlled image but a negative result should be given, the image classification module 323 will calculate a low accuracy rate or low confidence score. When the accuracy rate or the confidence score is below a predefined threshold, the image classification module 323 sends a verification request to the cloud server 101 or the web media server 111 to verify the result, because the servers with more computing power may use more complex algorithms or more advanced models to classify the image more efficiently.

In some embodiments, the image classification module 323 stores the classification result in the database 343 for fast retrieval. In other embodiments, the image classification module 323 may also communicate with the cloud server 101 to remotely store the classification result. The stored classification result may later be fed back to the at least one AI model for training purpose.

Figure 6A:
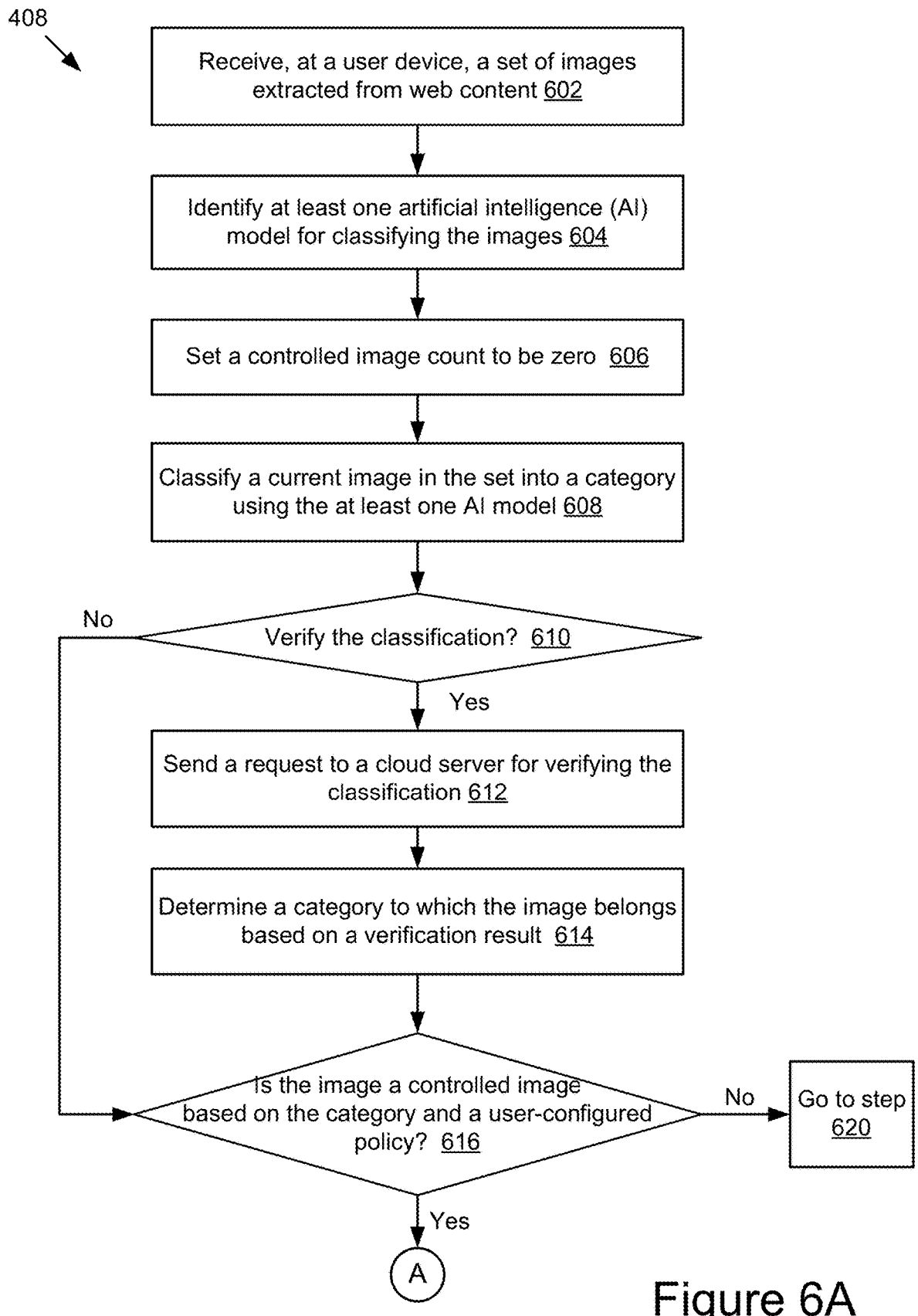
FIGS. 6A and 6B are a flowchart of an example method for performing dynamic image classification.
Figure 6B:
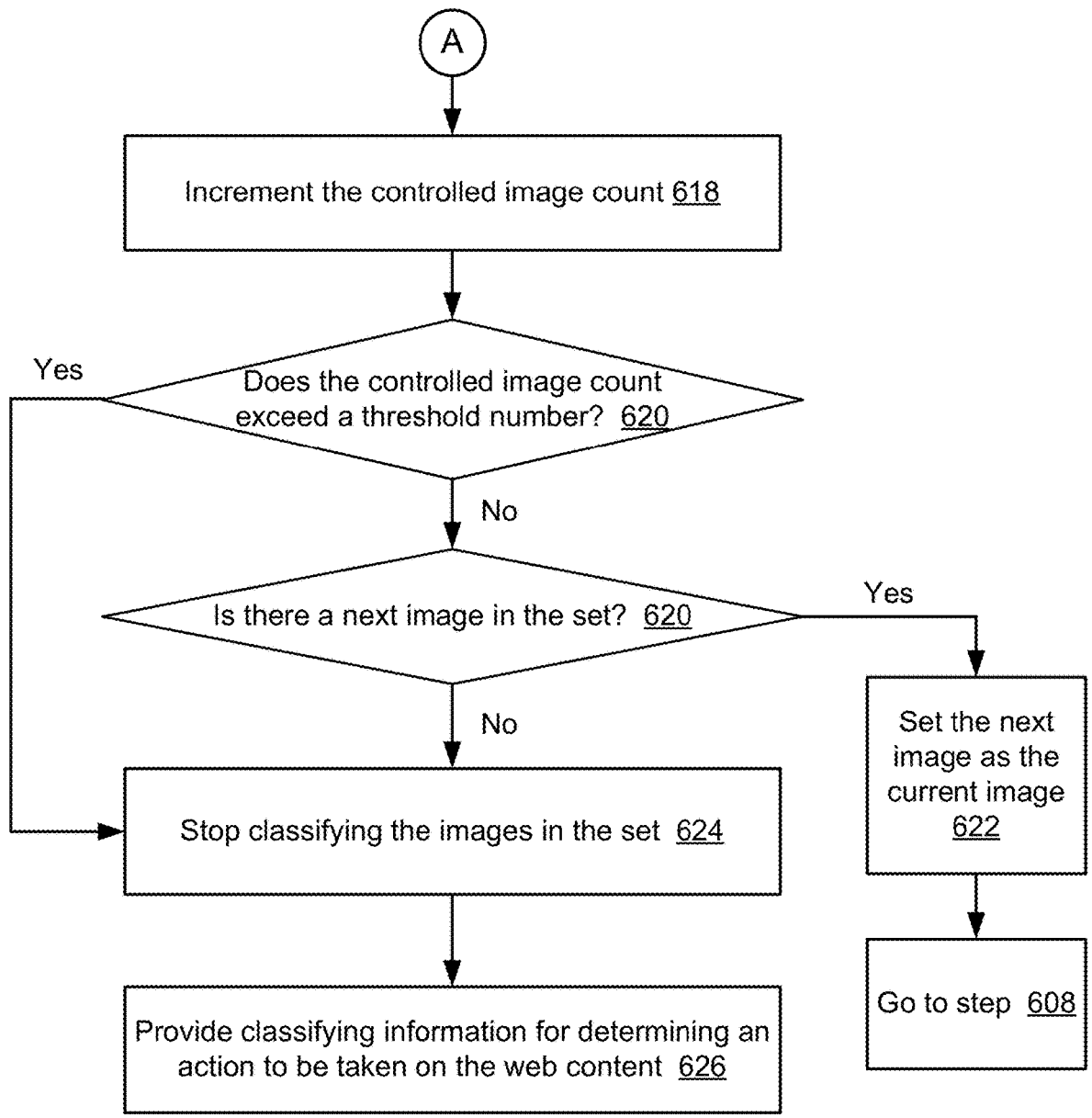

FIGS. 6A and 6B are a flowchart of an example method for performing dynamic image classification by the image classification module 323 in conjunction with the model engine 305, the verification engine 307, and the action engine 309. The method shown in FIGS. 6A-6B also corresponds to step 408 in FIG. 4.

At step 602, the image classification module 323 receives, at a user device, a set of images extracted from web content. At step 604, the image classification module 323 connects with the model engine 305 to identify at least one AI model for classifying the images.

At step 606, the image classification module 323 sets a controlled image count to be zero to indicate that no controlled image has been identified when the image classification starts. The image classification module 323 may set an image in the set to be a current image according to an order for classifying the images. At step 608, the image classification module 323 classifies the current image in the set into a category using the at least one AI model.

Referring to FIG. 6A, at step 610, the image classification module 323 determines whether to verify the classification. If it is determined that no verification is needed, the method proceeds to step 616. If it is determined that the verification is needed, at step 612, the image classification module 323 sends a request to a cloud server and/or a web media server for verifying the classification via the verification engine 307. At step 614, the image classification module 323 determines a category to which the image belongs based on a verification result. At step 616, the image classification module 323 determines whether the image is a controlled image based on the category and a user-configured policy. If the image is a controlled image, the method moves to step 618, where the controlled image count is incremented by one to reflect the newly identified controlled image. Otherwise, the method moves to step 620 without changing the controlled image count.

At step 620 of FIG. 6B, the image classification module 323 determines whether the controlled image count exceeds a threshold number. If yes, the image classification module 323 moves to step 624 to stop classifying the images in the set even if not all images in the set have been classified, which shortens the classification process and increases the efficiency. As a result, at step 626, the image classification module 323 provides classifying information for determining an action to be taken on the web content.

However, if it is determined at step 620 that the controlled image count does not exceed a threshold number, the image classification module 323 determines whether there is a next image in the set. If yes, at step 622, the image classification module 323 sets the next image as the current image and goes to step 608 to continue classifying the current image in the set. If there is no next image, i.e., all images in the set have been classified, the image classification module 323 stops the image classification at step 624, and also provides the classifying information for determining an action to be taken on the web content at step 626.

Referring back to FIG. 3, the video classification module 325 as depicted analyzes and classifies the video data extracted from the web content received at the user device 105. There are two approaches for the video analysis. One approach is that the video classification module 325 performs the real-time video analysis while the video is being played on the user device 105. Another approach is that the video classification module 325 keeps a buffer of a portion of the video data, and analyzes the buffered video data before the video content is displayed. The latter approach may prevent a user from viewing any inappropriate video content with an additional delay.

A video is a stream of time-related image frames. The adjacent image frames of the video usually are quite similar, which allows the video classification module 325 to skip analysis and classification of some of the adjacent image frames without impacting the classification accuracy. Therefore, instead of analyzing every single image frame of the video, the video classification module 325 may take samples of the image frames periodically, and analyze the sample image frames to determine whether the video is an appropriate/uncontrolled video, an inappropriate/controlled video, or an appropriate/uncontrolled video with some inappropriate/controlled content.

To prepare for the classification on sample images of the video, the video classification module 325 specifies a set of variables, which includes at least:

a first sampling rate or a regular sampling rate A that controls the frequency of taking image samples in a regular state, a second sampling rate or a monitor sampling rate B that controls the frequency of taking image samples in a monitor state, where the sampling rate B is configured to be larger than the sampling rate A, a monitor length C that defines the length of the monitor state, a mark length D that marks the length of a next video snippet in a false positive case, a controlled video length threshold E that defines a minimum length of the total controlled video snippets that allows a video to be marked as an inappropriate/controlled video, a maximum controlled image ratio F, or simply a maximum ratio, that defines a threshold of ratio of the controlled sample images over all the sample images in the monitor state. If an actual ratio determined for a video snippet exceeds this ratio F, the video classification module 325 determines that the video snippet is inappropriate/controlled, and a minimum controlled image ratio G, or simply a minimum ratio, that is also the ratio of the controlled sample images over all the sample images in the monitor state. If an actual ratio determined for a video snippet is lower than the ratio G, the video classification module 325 determines that the video snippet is appropriate or uncontrolled.

In some embodiments, the video classification module 325 performs the classification on sample images of the video based on the steps described below:

1) The video classification module 325 takes sample image frames of the video at the first sampling rate or rate A to determine a first set of sample images.

2) The video classification module 325 communicates with the model engine 305 to identify at least one AI model, and analyzes and classifies a current sample image in the first set using the at least one AI model. The video classification module 325 determines whether the current image is a controlled image. If it is determined that the current image is appropriate or uncontrolled, the video classification module 325 returns back to step 1 to identify another sample image in the first set as a current sample and classify the newly identified current sample image using the at least one AI model. However, if the current image is an inappropriate or controlled image, the video classification module 325 determines to enter a monitor state.

3) Once the classification is entered in the monitor state, the video classification module 325 samples a video snippet, of a monitor length (e.g. C seconds) subsequent to the controlled image at a second rate or rate B to determine a second set of sample images, and classifies the sample images in the second set. That is, the video classification module 325 takes more sample images than in the regular state, and monitors the classification of the sample images for C seconds. The video classification module 325 computes a controlled image ratio by dividing the number of the controlled sample images over the number of all the sample images during the C seconds.

If the computed controlled image ratio exceeds the maximum ratio F, the video classification module 325 determines that the video snippet of the C seconds is a controlled video snippet. The video classification module 325 communicates with the action engine 309 to take an action over the video snippet of the C seconds according to a user-configured policy to avoid presenting the inappropriate content to the user, and, further, adds the C seconds to a total controlled video length. If the total controlled video length exceeds the controlled video length threshold E, the video classification module 325 determines that the entire video should be controlled. Depend on the user-configured policy, the entire video may be blocked or an alert may be sent. If the total controlled video length does not exceed the controlled video length threshold E, the video classification module 325 determines to exit the monitor state and go back to the regular state as in step 1 for sampling images at rate A and classifying the sample images.

If the computed controlled image ratio is less than the minimum ratio G, then video classification module 325 determines that the video snippet is appropriate or good. As a result, the video classification module 325 determines to exit the monitor state and go back to the regular state as in step 1.

However, if the computed controlled image ratio is between the minimum ratio G and the maximum ratio F, the video classification module 325 cannot determine whether the video snippet of C seconds is appropriate or inappropriate. In this case, the video classification module 325 stays in the monitor state, and continues the monitoring for another video snippet for C seconds until the computed controlled image ratio becomes higher than the maximum ratio F or lower than the minimum ratio G.

In some embodiments, the video classification module 325 also communicates with the verification engine 307 solve a false positive issue of the classification, i.e., the video classification module 325 may send a request to a cloud server or a web media server to verify if the sample images are inappropriate when it determines that a video snippet of C seconds is inappropriate/controlled in the monitor state. If the verification result confirms that the video snippet is inappropriate/controlled, then the local classification result obtained in the user device 105 is correct. The video classification module 325 adds the C seconds to the total controlled length, and continues the video classification as described above. However, the verification result may show that the video snippet of C seconds is not controlled, which causes a false positive case. It is likely that the local classification performed by the video classification module 325 may continue to identify subsequent image frames as controlled since these images are similar to the previous ones. In this case, the video classification module 325 marks the video snippet of next D seconds as appropriate/uncontrolled by skipping or ignoring the local classification results for the next D seconds to circumvent the false positive issue. The video classification module 325 then exits the monitor state and goes back to a regular state in step 1.

For better performance, in some embodiments, the video classification module 325 may upload the video analysis result to the cloud server 101. In the future classification of the video (e.g., when a browser loads the video at a user device), the video classification module 325 may consult the cloud server 101 to determine if there is a classification result available for this video. If the classification result is available, the video classification module 325 skips the real time classification for this video to reduce the waste of computing resources. In other embodiments, the video classification module 325 may also store the classification results locally in the database 343.

Figure 7A:
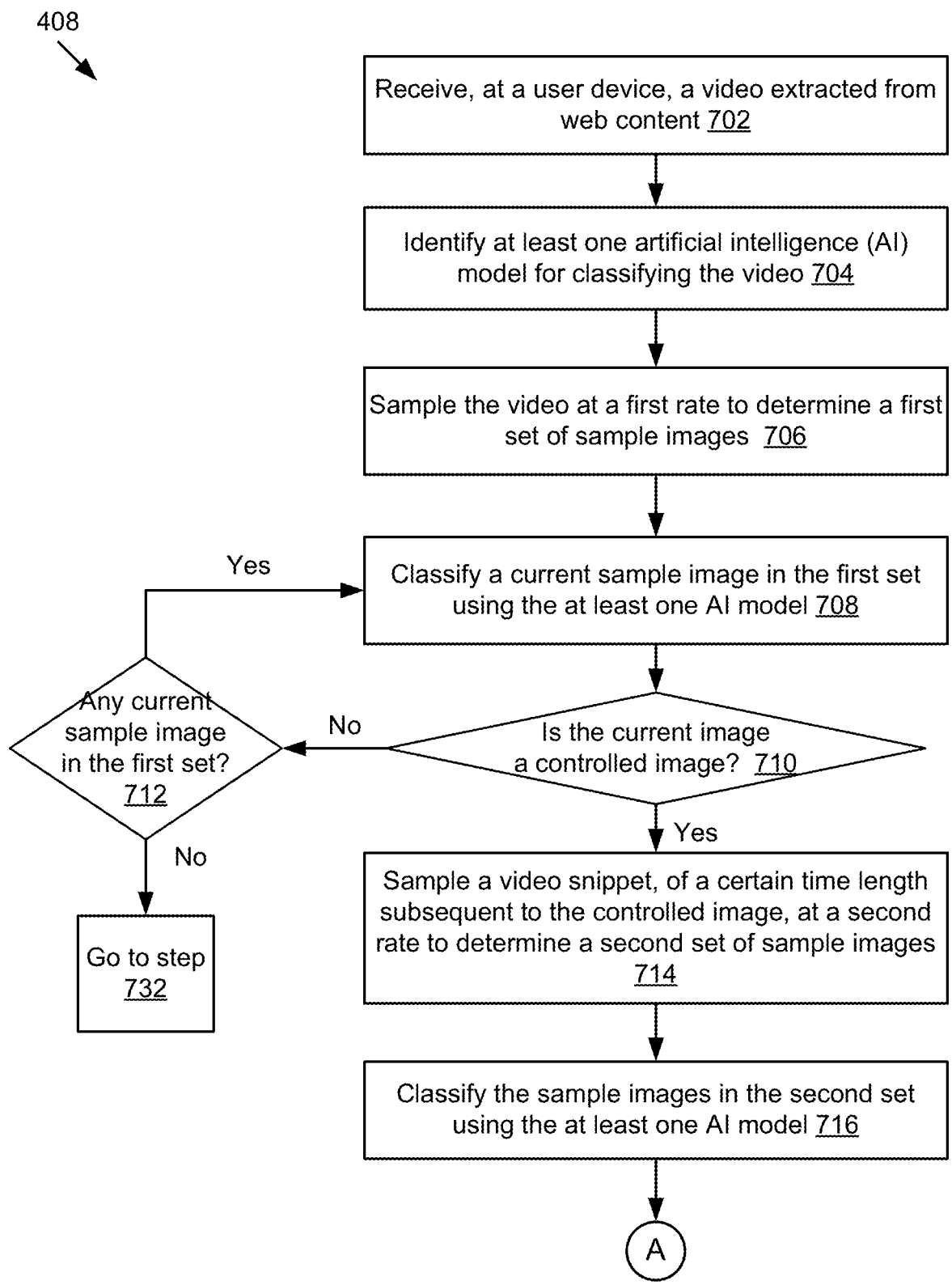
FIGS. 7A and 7B are a flowchart of an example method for performing dynamic video classification.
Figure 7B:
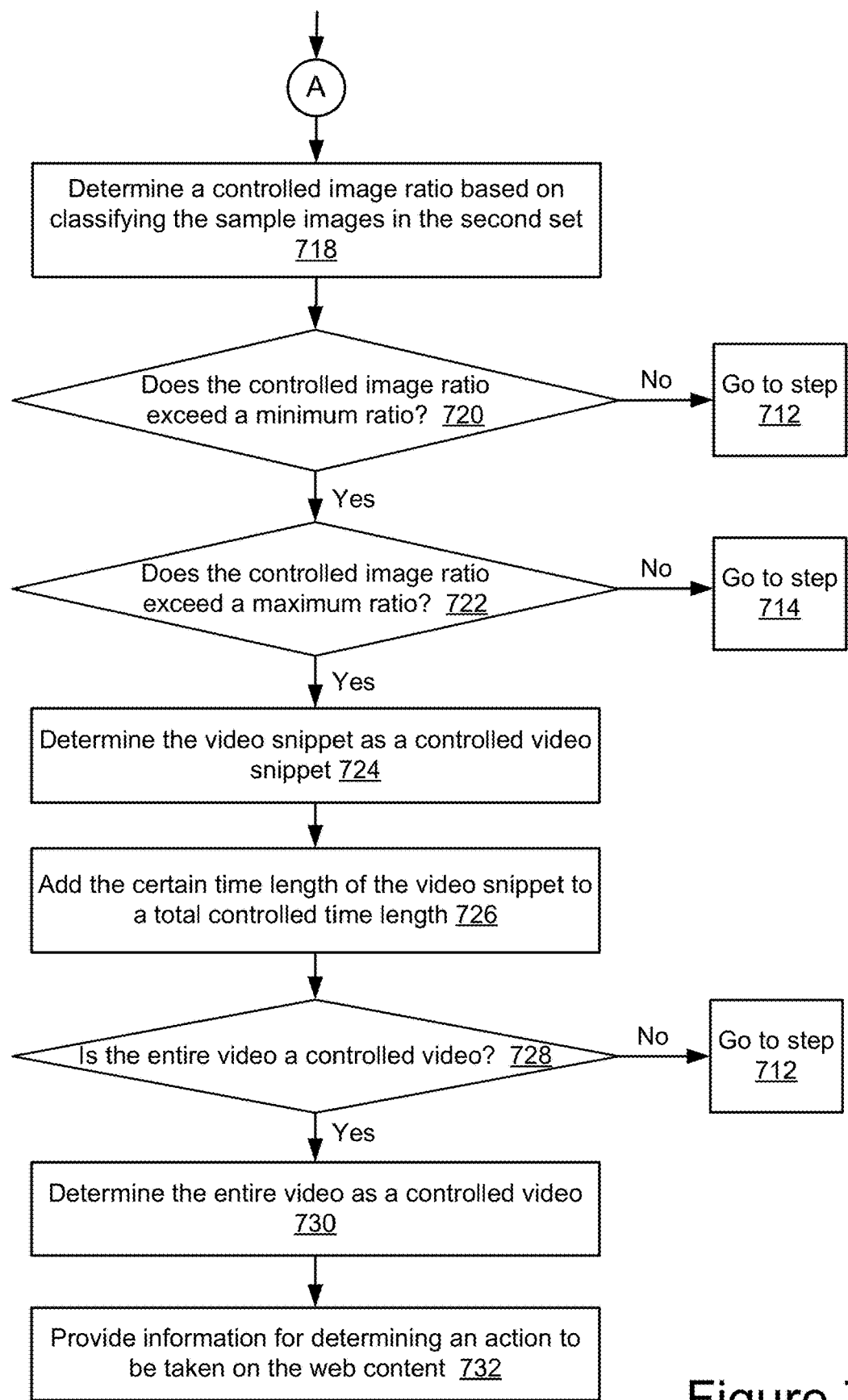

FIGS. 7A and 7B are a flowchart of an example method for performing dynamic video classification by the video classification module 325 in conjunction with the model engine 305, the verification engine 307, and the action engine 309. The method shown in FIGS. 7A-7B also corresponds to step 408 in FIG. 4.

Referring to FIG. 7A, at step 702, the video classification module 325 receives, at a user device, a video extracted from web content. At step 704, the video classification module 325 connects with the model engine 305 to identify at least one AI model for classifying the video.

At step 706, the video classification module 325 samples the video at a first rate or rate A to determine a first set of sample images. The video classification module 325 selects an image in the first set as a current sample image. At step 708, the video classification module 325 classifies the current sample image in the first set using the at least one AI model.

At step 708, the video classification module 325 determines whether the current image is a controlled image. If the current image is not a controlled image, at step 712, the video classification module 325 determines whether there is any current sample image in the first set. If yes, the video classification module 325 goes back to step 708 to continue classifying the current image. If no, the method proceeds to step 732, where information is provided to the action engine 309 for determining an action to be taken.

If the current image is a controlled image, at step 714, the video classification module 325 samples a video snippet, of a certain time length (e.g., C seconds) subsequent to the controlled image, at a second rate or rate B to determine a second set of sample images. At step 716, the video classification module 325 classifies the sample images in the second set using the at least one AI model.

In FIG. 7B, at step 718, the video classification module 325 determines a controlled image ratio based on classifying the sample images in the second set. At step 720, the video classification module 325 determines whether the controlled image ratio exceeds a minimum ratio (e.g., ratio G). If the controlled image ratio does not exceed the minimum ratio G, which means the image is identified as an appropriate or uncontrolled image, the method goes to step 712 to continue the classification of images in the first set.

If the controlled image ratio exceeds the minimum ratio G, at step 722, the video classification module 325 determines whether the controlled image ratio exceeds a maximum ratio (e.g., ratio F). If the controlled image ratio does not exceed the maximum ratio F, which means the image cannot be identified as an appropriate or inappropriate image, the method goes to step 714 to continue the monitoring of another video snippet. If the controlled image ratio exceeds the maximum ratio F, the video classification module 325 determines the video snippet as a controlled video snippet at step 724, and adds the certain time length of the video snippet (e.g., C seconds) to a total controlled time length. At step 728, the video classification module 325 determines whether the entire video is a controlled video based on the total controlled time length. If yes, the video classification module 325 determines the entire video as a controlled video at step 730, and provides information for determining an action to be taken on the web content at step 732. Otherwise, the method goes back to step 712 to continue the classification of images in the first set.

Turning now to FIG. 3, it shows an audio classification module 327 that performs dynamic audio classification. In some embodiments, upon receiving audio data extracted from the web content received at the user device 105, the audio classification module 327 transforms the audio data to spectrograms, i.e., images of the spectrum of frequencies. The audio classification module 327 communicates with the model engine 305 to identify a spectrogram classification model to classify the spectrogram into an appropriate/uncontrolled or inappropriate/controlled category.

A spectrogram may be a two-dimensional image, with a horizontal dimension as time (in seconds) and a vertical dimension as frequency (in Hz). The audio classification module 327 may divide the spectrogram of an audio into multiple images of fixed time length. For example, the audio classification module 327 may evenly divide a spectrogram of 120 seconds into 12 groups of images with a duration of each group being 10 seconds. In this way, an audio is converted to a sequence of images or video. Therefore the audio classification module 327 may apply the same approach, used for classifying a video by the video classification model 325, to analyze and classify an audio, but with different parameters and different classification model(s) trained with spectrograms.

In some embodiments, the audio classification module 327 also computes a ratio of controlled classifications/predictions and uncontrolled predictions, and compares the ratio to a predefined threshold. If the computed ratio exceeds the predefined threshold, the audio classification module 327 classifies the entire video as inappropriate. Otherwise, the audio is classified as appropriate.

Figure 8:
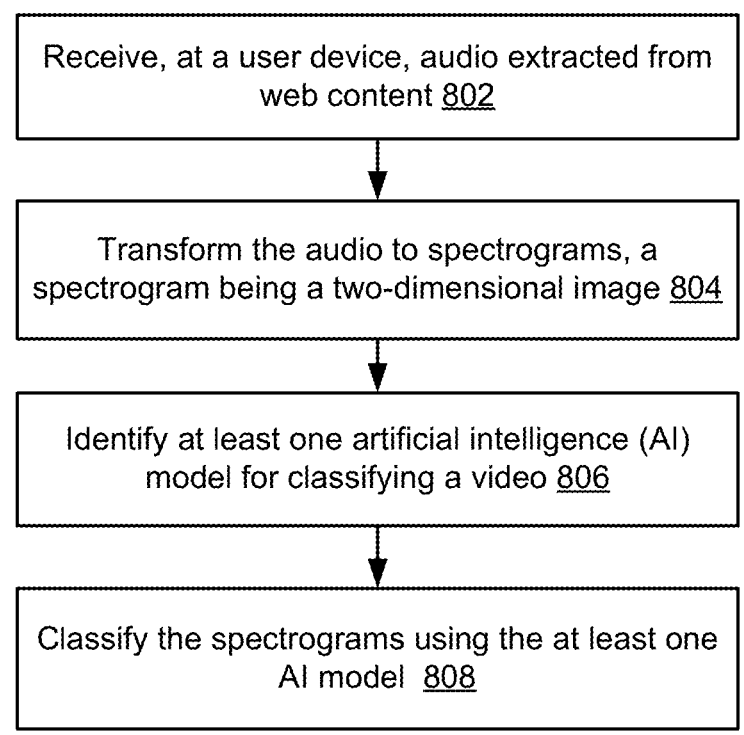
FIG. 8 is a flowchart of an example method for performing dynamic audio classification.

FIG. 8 is a flowchart of an example method for performing dynamic audio classification, which also corresponds to step 408 in FIG. 4. At step 802, the audio classification module 327 receives, at a user device, an audio extracted from web content. At step 804, the audio classification module 327 transforms the audio to spectrograms, a spectrogram being a two-dimensional image. Therefore an audio is considered to be a sequence of images or video. At step 804, the audio classification module 327 communicates with the model engine 305 to identify at least one AI model for classifying the video. At step 806, the audio classification module 327 classifies the spectrograms using the at least one AI model, which is similar to the video classification procedure as shown in FIGS. 7A and 7B, and thus will not be repeated herein.

The model engine 305 builds and trains AI models used in the classification of media data. In some embodiments, responsive to receiving web content at the user device 105 (e.g., a webpage loaded by a browser, a chatting message sent to the user of the user device), the data receiving module 301 extracts different types of media data, including text, image, video, and audio, from the web content received at the user device 105. The classification module 303 receives the extracted media data passed by the data receiving module 301, and communicates with the model engine 305 to identify at least one AI model for classifying each type of media data.

The model engine 305 may build an AI model that satisfy certain requirements to implement the classification of media data in real-time. First, the model engine 305 may build a small-sized model such that it can work efficiently by a web control component 103 embedded in or integrated with a browser or a web media application running on the user device 105 that has limited computing power. Second, the model engine 305 may build a model with a short response time (i.e., time used for classification or prediction) to dynamically classify the web content without interrupting users. Third, the model engine 305 ensures that the false positive rate, of classifying appropriate/uncontrolled or inappropriate/controlled content using the AI model, to be close to zero so that the appropriate web content will not be mistakenly blocked. Therefore the browser having the web control ability, e.g., equipped with the web control component 103 including the model engine 305, may function at least as well as a traditional browser without dynamic content classification. In addition, the overall accuracy of the classification using the AI model (e.g., a percentage or a number of correct predictions) determined by the model engine 305 is required to achieve a specific level so that a specific percentage of inappropriate content may be filtered, and either "appropriate" or "inappropriate" content may be further accurately classified into subcategories.

According to the type of media data, the model engine 305 may build and train one or more text classification models, image classification models, and audio classification models. An image classification model is used for processing images and videos.

In some embodiments, a text classification model may be a machine learning model, for example, a support vector machine (SVM) model, a neural network model, etc. The text classification model meets the specific requirements for real-time text classification, for example, having a size less than ten megabytes, a response time less than five milliseconds, a false positive rate lower than 1%, and an overall accuracy higher than 95%.

Figure 9:
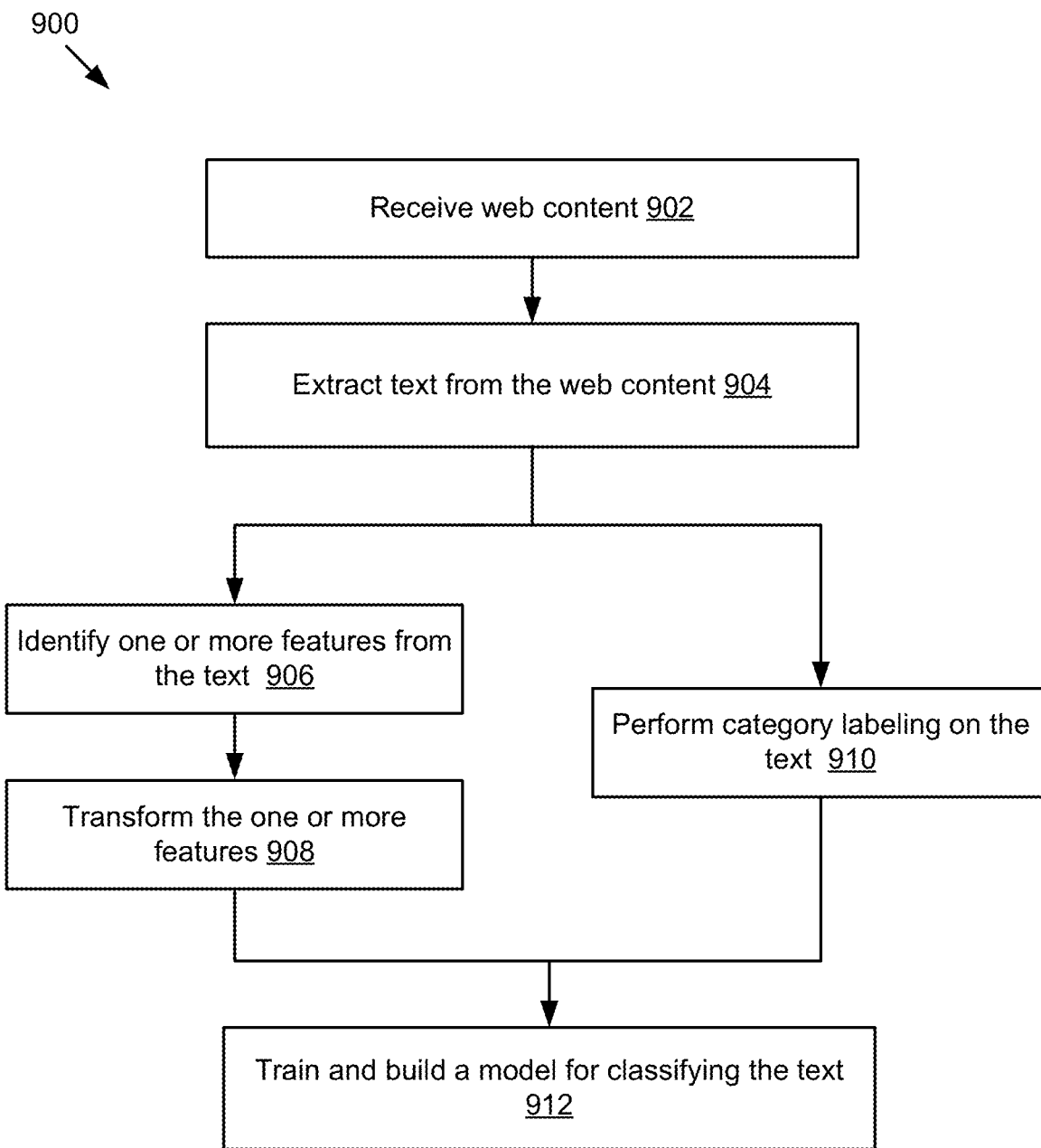
FIG. 9 is a flowchart of an example method for training a text classification model.

FIG. 9 is a flowchart of an example method 900 for training a text classification model. The model engine 305 communicates with the data receiving module 301 to receive web content at step 902, and to extract text from the web content at step 904. Next, at step 906, the model engine 305 identifies one or more features from the text, and, at step 908, transforms the one or more features to a numerical representation (e.g., in the form of a vector) used in the model. For example, the model engine 305 may determine a term frequency-inverse document frequency (TF-IDF) vector based on normalized word frequencies. In the meantime, at step 910, the model engine 305 also performs category labeling on the text. For example, the model engine 305 may label the text in a first layer as "appropriate" or "inappropriate." Depending on the label in the first layer, the model engine 305 may categorize the text in a second layer as "art," "porn," "gambling," "game," etc. Depending on the labels in the second layer, the model engine 305 may classify the text in a third layer, and so on. The model engine 305 may then feed training data that includes the transformed feature representation (e.g., vectors for each text) and the labels into a machine learning algorithm to produce a text classification model, that is, train and build a model for classing the text at step 912. Once a classification result based on the application of the text classification model is obtained, the model engine 305 may also feedback the result to the text classification model to refine the model. Therefore the overall performance of the text classification model will be improved.

The model engine 305 creates and trains a text classification model using novel techniques. For example, the model engine 305 may build a neural network model to take advantages of sparse matrix(s) derived from text features to efficiently train the model and minimize the model size. Instead of using embeddings as many typical neural network models do, the model engine 305 directly takes the TF-IDF values as input and uses a sparse look up function built in a machine learning library (e.g., an open source machine learning library TensorFlow) to achieve efficiency.

In addition, the model engine 305 may build multiple models to achieve a same goal, for example, using three models to perform binary classification to determine "good" (appropriate content) or "bad" (inappropriate content), in order to minimize the false positive rate as well as maximize an overall accuracy. Moreover, the multiple models may be of different types. The model engine 305 may apply different types of models to different data portions to optimize the classification performance. For example, the multiple models may include a neural network model and two SVM models. The model engine 305 uses the neural network and one of the SVM models on a large set of text data, while using the other SVM model on a small set of text data.

Similarly to the foregoing process of generating the text classification model, the model engine 305 may also build multiple image classification models for image/video classification. In some embodiments, the model engine 305 may create a first image classification model to predict whether an image is appropriate or inappropriate, and create a general image classification model for classifying the appropriate/inappropriate images into subcategories. In other embodiments, the model engine 305 may build a relatively small-sized image classification model to perform real-time image classification on the user device 105. The server-side web control component 103' in the server side (e.g., a cloud server) may build a large-sized image classification model to do more complicated or more accurate classification.

Figure 10:
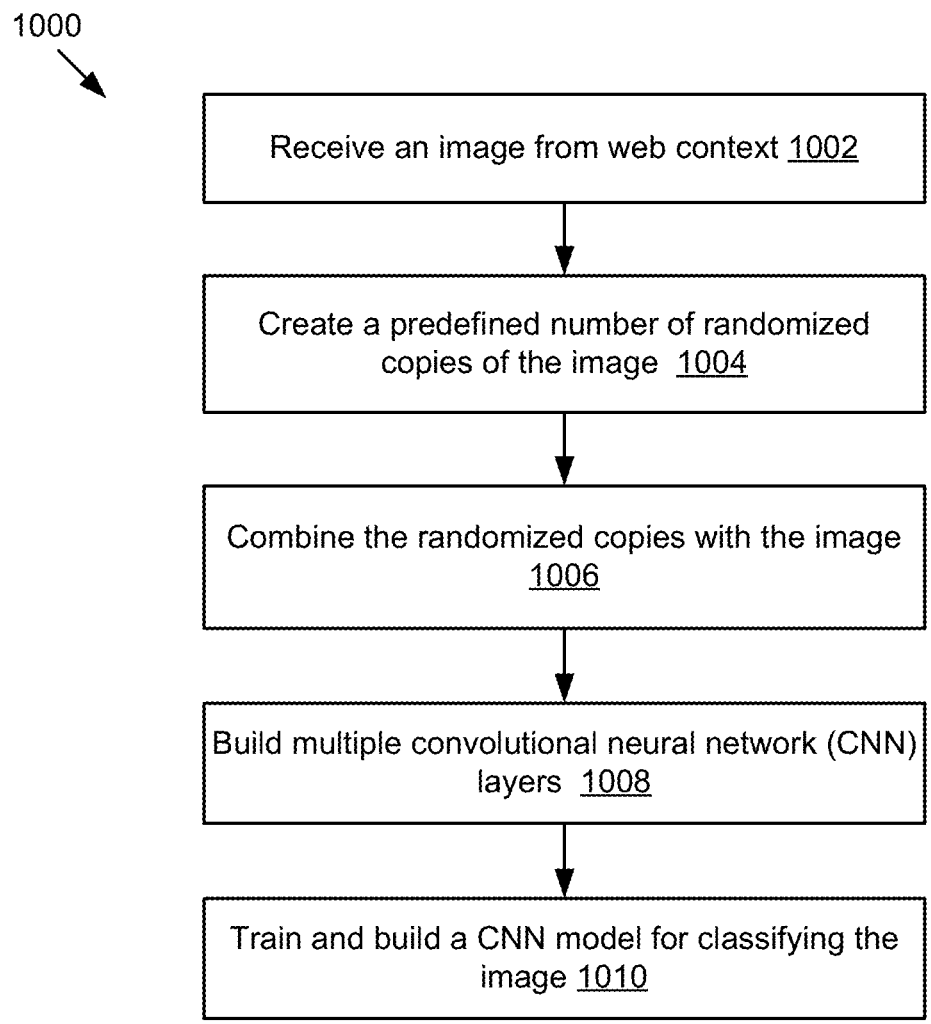
FIG. 10 is a flowchart of an example method for training an image classification model.

FIG. 10 is a flowchart of an example method 1000 for training an image classification model. At step 1002, the model engine 305 receives an image from web content, i.e., an image extracted by the data receiving module 301 from the web content received at the user device 105. At step 1004, the model engine 305 creates a predefined number of randomized copies of the image. For example, the model engine 305 may create eight randomized copies of the image based on random cropping (e.g., on three copies), rotating, and adjusting parameters (e.g., contrast, brightness, sharpness). At step 1006, the model engine 305 combines the randomized copies with the image, for example, by pasting the eight copies and the original image to create a combined image for training. At step 1008, the model engine 307 builds multiple convolutional neural network (CNN) layers of a CNN model, for example, based on alternating convolutional layers and max-pooling layers, keeping filter size and strides constant over layers but decreasing the kernel size and pool size, etc. At step 1010, the model engine 305 trains and builds the CNN model for classifying the image.

The model engine 305 also builds an audio classification model to classify good or bad audio. In some embodiments, the audio classification module 327 transforms an audio to a plurality of spectrograms. The model engine 305 builds the audio classification model to classify each of the plurality of spectrograms. The creation and training of the audio classification model are similar to the image classification model described above, which will not be repeated herein.

In addition to the foregoing model creation and training processes, in some embodiments, the model engine 305 may add other features in building and training the models. The model engine 305 may capture the commonalities among users and improve the training of the models. For example, the model engine 305 may determine that students in the same school read the same books, and adds this commonality to the training of the model to improve the performance such as lowering the false-positive rate. The model engine 305 may also partition the models based on user attributes and build a personalized model for individual users. The user attributes may include demographical data, historical data, personality data, etc.

The verification engine 307 receives a verification request from the classification module 303, and verifies a classification/category of the web content as requested. Since the user device 105 (e.g., a handset device) usually has limited computing power in contrast to the cloud server 101 or the web media server 111, the web control implemented on the user device or client side needs to be balanced between accuracy and computer capacity. As a result, the web control component 103 on the user device 105 may be designed to produce a highly-accurate classification or prediction (e.g., equal or greater than a specific threshold level) on certain web content while leave the remaining not highly-accurate classification (e.g., less than the specific threshold level) for verification by the server.

In some embodiments, the verification engine 307 verifies a classification result from the classification module 303 to solve a potential false positive issue of the classification. For example, the classification module 303 may send a request to the cloud server 101 to verify the result when an image is classified as a controlled/inappropriate image. The cloud server 101 has more powerful computing power and can do classification with more complex algorithms or more advanced models, thereby preventing a possible false positive result created by using a light-weighted model for controlling the web content received at the user device 105.

The action engine 309 communicates with other modules/engines to determine and take an action on the web content received at the user device 105. In some embodiments, the action engine 309 determines an action to be taken over the web content based on information received from other modules/engines and a user-configured policy. The user-configured policy indicates each user's preference in allowing/blocking content on a specific category. For example, an adult may set up a policy to allow the social networking content but setting up a policy to block the social networking content for a minor.

In some embodiments, responsive to receiving information to block the web content (e.g., from the data receiving model 301), the action engine 309 instructs the user interface engine 311 to notify the user device 105 of the block of the web content. In other embodiments, responsive to receiving a classification result from the classification module 303, the action engine 309 communicates with the user interface engine 311 to present the web content on the user device 105. Depending on the classification result, the action engine 309 may instruct the user interface 311 to present the entire web content to the user 125 of the user device 105, or to modify a portion of the web content with a specific effect and to present the modified content along with the rest of unchanged content to the user 125 of the user device 105. The specific effect includes blurring an image, redacting a word, muting an audio snippet, etc.

The user interface 311 generates a user interface for displaying graphic data on the user device 105. In some embodiments, the user interface engine 311, instructed by the action engine 30 or other modules/engines, presents the web content received at the user device 105 to a user 125 accessing the user device 105. For example, the user interface engine 311 may generate an alert for display on the user device to notify a block of web content. Or the user interface engine 311 may generate specific effects on certain web content for presenting to the user. In other embodiments, the user interface engine 311 may also generate a user interface to accept the user input for a user-configured policy. For example, the user interface engine 311 may generate a list of categories for presenting to the user 125 and receive user's selection regarding the allow/block preference for each category.

Figure 11A:
FIGS. 11A-11C are example user interfaces of web content shown in a browser before and after real-time analysis and classification.
Figure 11B:
Figure 11C:
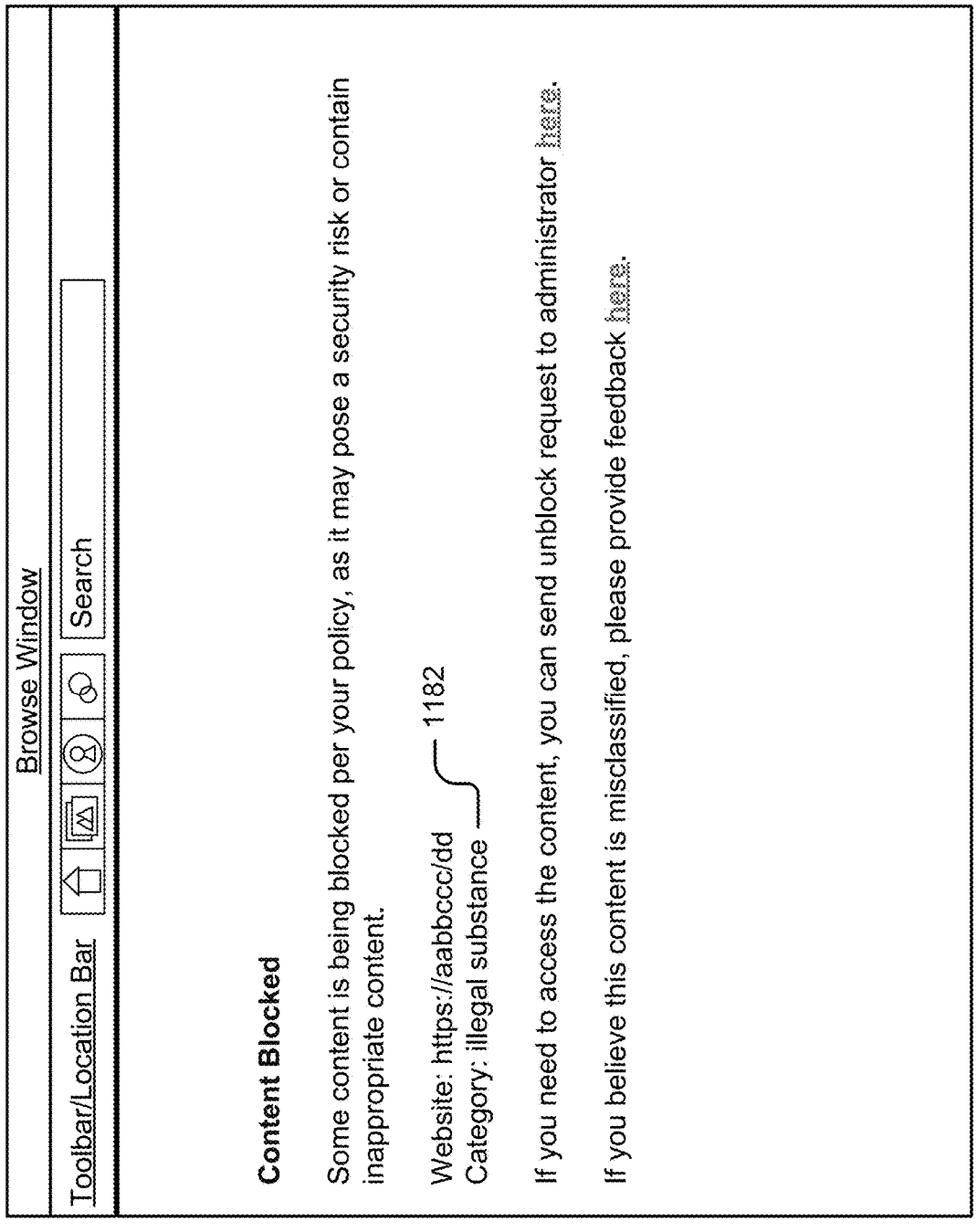

FIGS. 11A-11C are example user interfaces of web content shown in a browser before and after real-time analysis and classification. In the user interface 1100 of FIG. 11A, an original web page, i.e., the content without real-time analysis, is shown. This web page includes an introduction of two kinds of plants. In particular, the web page includes an image 1102. After real-time classification is performed for the web page shown in FIG. 11A, the results are shown in FIGS. 11B and 11C. In FIG. 11B, the image 1102 has been processed to be visually unseen to a user as of image 1152. In FIG. 11C, a notification is shown to alert the user that some content has been blocked per user's policy. A category in 1182 shows that the content belongs to this category is blocked.

Figure 12A:
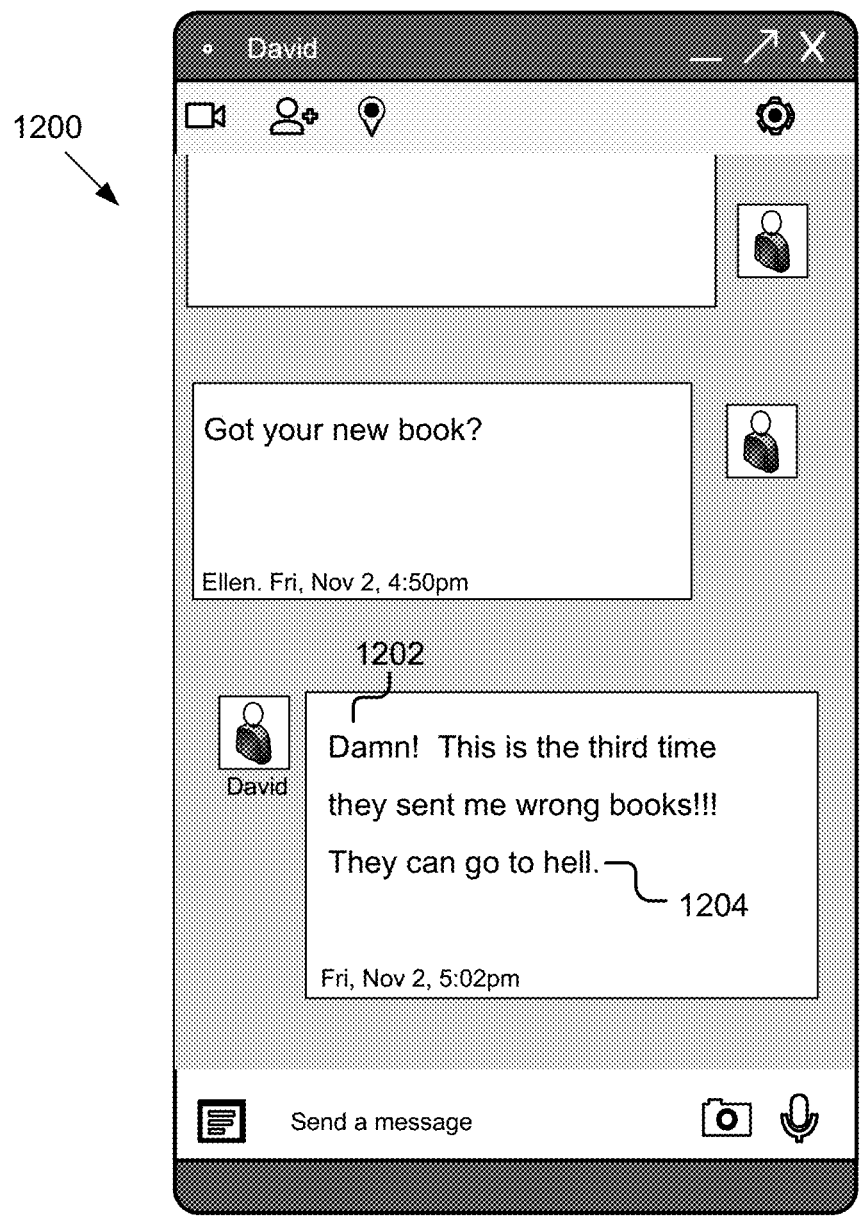
FIGS. 12A-12C are example user interfaces of web content shown in a web media application before and after real-time analysis and classification.
Figure 12B:
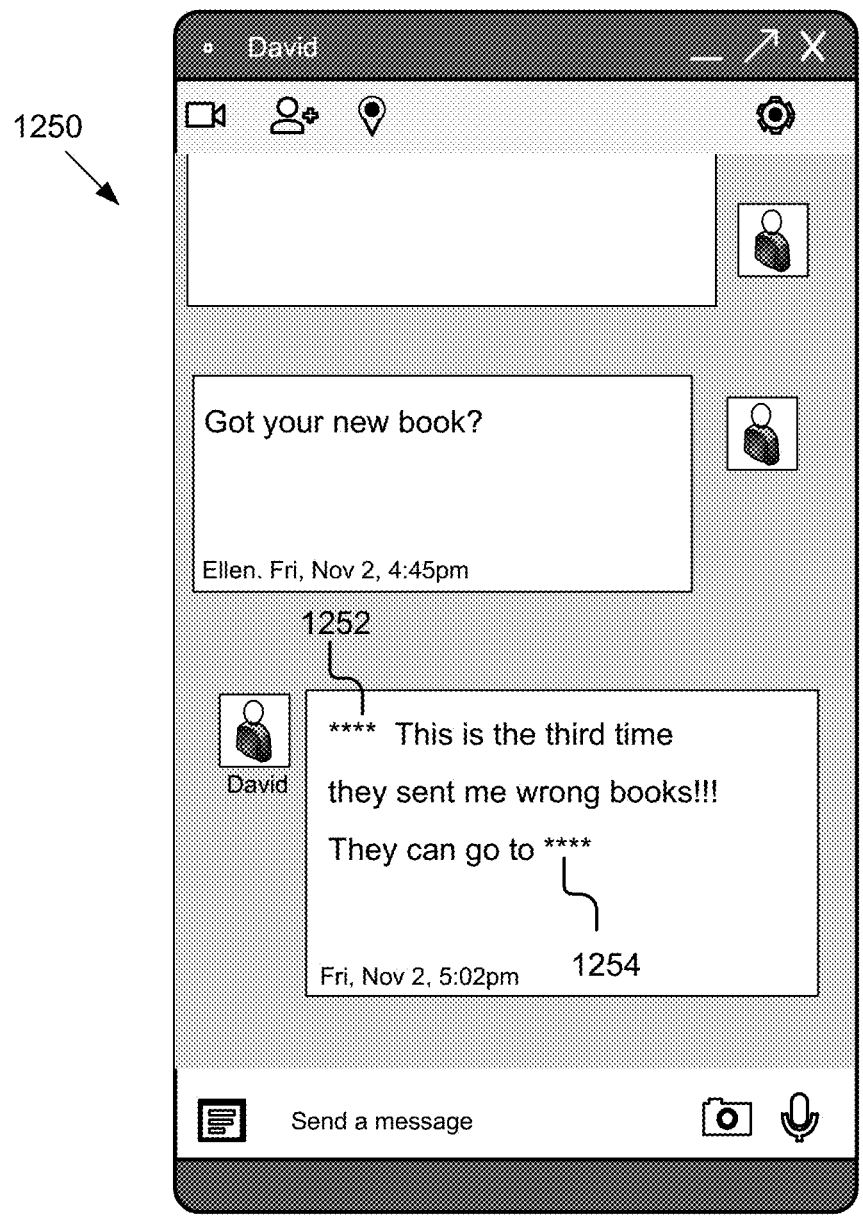
Figure 12C:
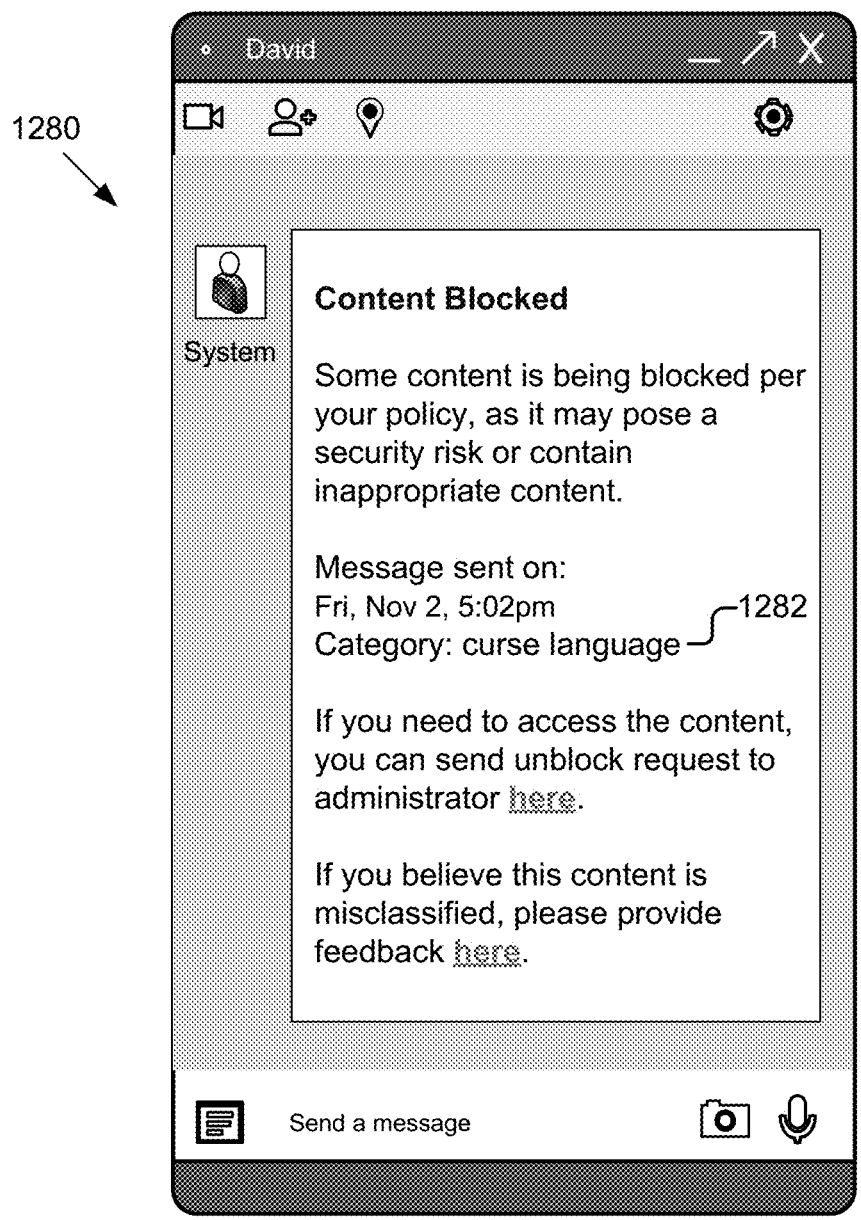

FIGS. 12A-12C are example user interfaces of web content shown in a web media application before and after real-time analysis and classification. Similarly, the content, i.e., online chatting messages, before real-time analysis is shown in FIG. 12A, while the content after the classification and analysis are shown in FIGS. 11B and 11C. In the user interface 1200 of FIG. 12A, two words are still viewable in 1202 and 1204. After the real-time analysis, these two words are replaced by "****" respectively shown in 1252 and 1254 of the user interface 1250 in FIG. 12B for the reason displayed in FIG. 12C. The category 1282 in FIG. 12C tells the user why those words are blocked.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
    receiving, at a user device, web content for display on the user device;
    identifying, by the user device, at least one model for classifying the web content;
    performing, by the user device, real-time analysis on the web content using the at least one model to classify the web content and determine a classification result, wherein the real-time analysis is performed after the web content is received at the user device and before information relevant to the web content is displayed on the user device; and
    after classifying the web content, taking an action on the web content by displaying the web content via a browser on the user device with a portion of the web content being modified with a specific effect based on the classification result and with a remaining portion of the web content unchanged.

2. The method of claim 1, further comprising:
    extracting, by the user device, a type of media data from the web content;
    wherein the type of media data includes at least one of a video, audio, image, and text; and
    wherein the real-time analysis is performed on the type of media data.

3. The method of claim 2, further comprising:
    identifying a key passage from the text based on the at least one model;
    determining and analyzing context of the key passage using the at least one model; and
    wherein performing, at the user device, the real-time analysis on the web content includes classifying the key passage based on the context and the at least one model.

4. The method of claim 2, further comprising:
    sampling the video at a rate to determine a set of sample images; and
    wherein performing, at the user device, the real-time analysis on the web content includes classifying the sample images in the set.

5. The method of claim 4, further comprising:
    computing a controlled image ratio based on classifying the sample images;

determining whether the controlled image ratio exceeds a threshold ratio, the threshold ratio including at least a minimum ratio and a maximum ratio; and wherein taking the action on the web content at the user device is based on the determination.

6. The method of claim 2, further comprising:
transforming the audio to spectrograms, a spectrogram being a two-dimensional image; and
wherein performing, at the user device, the real-time analysis on the web content includes classifying the spectrograms using the at least one model.

7. The method of claim 1, wherein, responsive to performing, at the user device, the real-time analysis on the web content using the at least one model to classify the web content and determine the classification result, the method further comprises:
determining whether verification of a classification included in the classification result is needed;
responsive to determining the verification is needed, sending a verification request to a cloud server for verifying the classification; and
wherein taking the action on the web content at the user device is based on the verification of the classification.

8. The method of claim 1, wherein the action further includes notifying the user device of a block of the web content, and wherein the specific effect includes at least one of blurring an image, redacting a word, and muting an audio portion.

9. A computer-implemented method comprising:
receiving, at a user device, web content for display on the user device;
determining whether to classify the web content by the use device;
responsive to determining to classify the web content by the user device:
identifying, by the user device, at least one model for classifying the web content; and
performing, by the user device, real-time analysis on the web content using the at least one model to classify the web content and determine a classification result, wherein the real-time analysis is performed after the web content is received at the user device and before information relevant to the web content is displayed on the user device;
responsive to determining not to classify the web content by the user device:
notifying, by the user device, a cloud server for classifying the web content and determining the classification result;
receiving, by the user device, the classification result from the cloud server; and
after classifying the web content, taking an action on the web content by displaying the web content via a browser on the user device with a portion of the web content being modified with a specific effect based on the classification result and with a remaining portion of the web content unchanged.

10. A system comprising:
a processor; and
a memory storing one or more instructions that, when executed, cause the processor to implement operations including:
receiving, at a user device, web content for display on the user device;
identifying, at the user device, at least one model for classifying the web content;
performing, at the user device, real-time analysis on the web content using the at least one model to classify the web content and determine a classification result, wherein the real-time analysis is performed after the web content is received at the user device and before information relevant to the web content is displayed on the user device; and
after classifying the web content, taking an action on the web content by displaying the web content via a browser on the user device with a portion of the web content being modified with a specific effect based on the classification result and with a remaining portion of the web content unchanged.

11. The system of claim 10, further comprising:
extracting, at the user device, a type of media data from the web content;
wherein the type of media data includes at least one of a video, audio, image, and text; and
wherein the real-time analysis is performed on the type of media data.

12. The system of claim 11, further comprising:
identifying a key passage from the text based on the at least one model;
determining and analyzing context of the key passage using the at least one model; and
wherein performing, at the user device, the real-time analysis on the web content includes classifying the key passage based on the context and the at least one model.

13. The system of claim 11, further comprising:
sampling the video at a rate to determine a set of sample images; and
wherein performing, at the user device, the real-time analysis on the web content includes classifying the sample images in the set.

14. The system of claim 13, further comprising:
computing a controlled image ratio based on classifying the sample images;
determining whether the controlled image ratio exceeds a threshold ratio, the threshold ratio including at least a minimum ratio and a maximum ratio; and
wherein taking the action on the web content at the user device is based on the determination.

15. The system of claim 11, further comprising:
transforming the audio to spectrograms, a spectrogram being a two-dimensional image; and
wherein performing, at the user device, the real-time analysis on the web content includes classifying the spectrograms using the at least one model.

16. The system of claim 10, wherein, responsive to performing, at the user device, the real-time analysis on the web content using the at least one model to classify the web content and determine the classification result, the one or more instructions cause the processor to implement operations including:
determining whether verification of a classification included in the classification result is needed;
responsive to determining the verification is needed, sending a verification request to a cloud server for verifying the classification; and
wherein taking the action on the web content at the user device is based on the verification of the classification.

17. The system of claim 10, wherein the action further includes notifying the user device of a block of the web content.

18. The system of claim 17, wherein the specific effect includes at least one of blurring an image, redacting a word, and muting an audio portion.

\* \* \* \* \*